（12） United States Patent
Bae et al.

(10) Patent No.: US 12,256,118 B2
(45) Date of Patent: Mar. 18, 2025

(54) WIRELESS DISPLAY SYSTEM

(71) Applicant: LG ELECTRONICS INC., Seoul (KR)

(72) Inventors: Yujin Bae, Seoul (KR); Gowoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/280,084

(22) PCT Filed: May 7, 2021

(86) PCT No.: PCT/KR2021/005741
§ 371 (c)(1),
(2) Date: Sep. 1, 2023

(87) PCT Pub. No.: WO2022/234874
PCT Pub. Date: Nov. 10, 2022

(65) Prior Publication Data
US 2024/0163494 A1    May 16, 2024

(51) Int. Cl.
*H04N 21/422* (2011.01)
*H04N 21/4363* (2011.01)
*H04N 21/4425* (2011.01)

(52) U.S. Cl.
CPC . *H04N 21/42204* (2013.01); *H04N 21/43637* (2013.01); *H04N 21/4425* (2013.01)

(58) Field of Classification Search
CPC ....... H04N 21/42204; H04N 21/43637; H04N 21/4425; H04N 21/44227; H04N 21/485; H04N 21/4882
See application file for complete search history.

(56) References Cited

U.S. PATENT DOCUMENTS

| 2007/0162931 | A1* | 7/2007 | Mickle | H04N 5/44 |
| 2010/0259682 | A1* | 10/2010 | Unger | H04N 5/44 |
| 2014/0090003 | A1 | 3/2014 | Eguchi et al. | |
| 2016/0306949 | A1 | 10/2016 | Tallapaneni | |

FOREIGN PATENT DOCUMENTS

| JP | 2017135482 | 8/2017 |
| KR | 1020070082798 | 8/2007 |
| KR | 10-2009-0050648 | 5/2009 |
| KR | 10-2014-0085278 | 7/2014 |
| KR | 101961708 | 3/2019 |
| KR | 1020190048425 | 5/2019 |
| KR | 1020210030721 | 3/2021 |

OTHER PUBLICATIONS

PCT International Application No. PCT/KR2021/005741, International Search Report dated Jan. 26, 2022, 5 pages.
European Patent Office Application Serial No. 21939885.6, Search Report dated Jan. 7, 2025, 10 pages.

* cited by examiner

*Primary Examiner* — Anthony Bantamoi
(74) *Attorney, Agent, or Firm* — LEE, HONG, DEGERMAN, KANG & WAIMEY

(57) ABSTRACT

The present disclosure relates to a wireless display system comprising: a reception module including a display and a memory; and a transmission module which transmits and receives an image signal and a control signal to and from the reception module, wherein the reception module may display a guide stored in the memory on the display when wireless communication with the transmission module is not connected.

15 Claims, 22 Drawing Sheets

FIG. 7
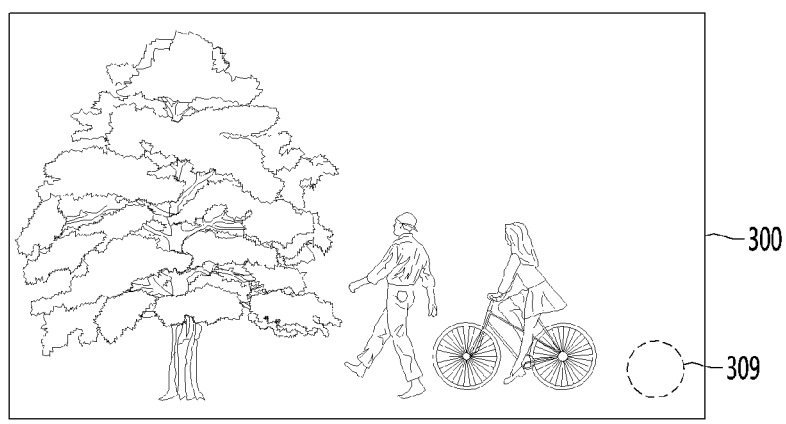
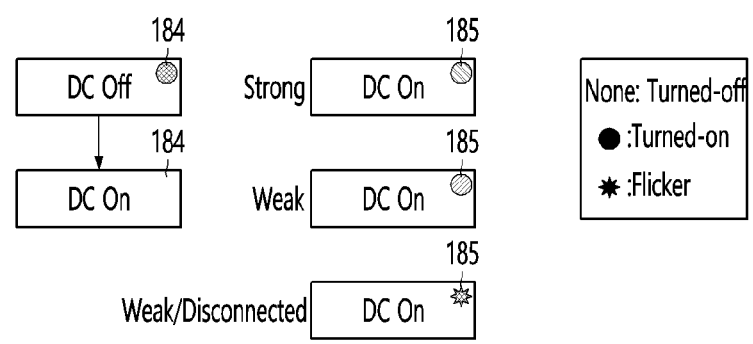

FIG. 9
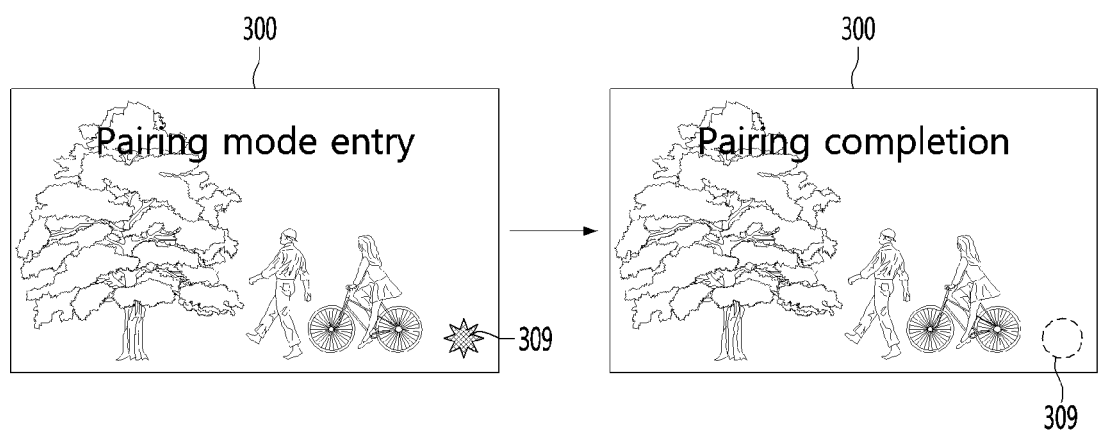
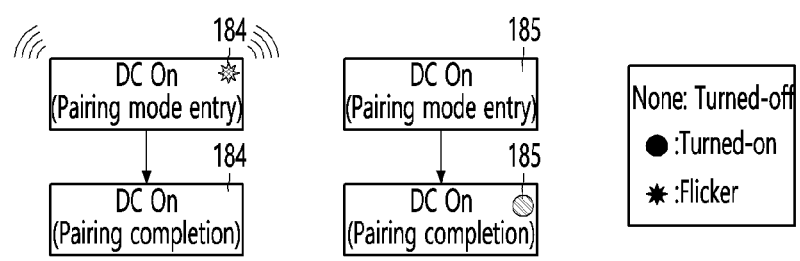

FIG. 11
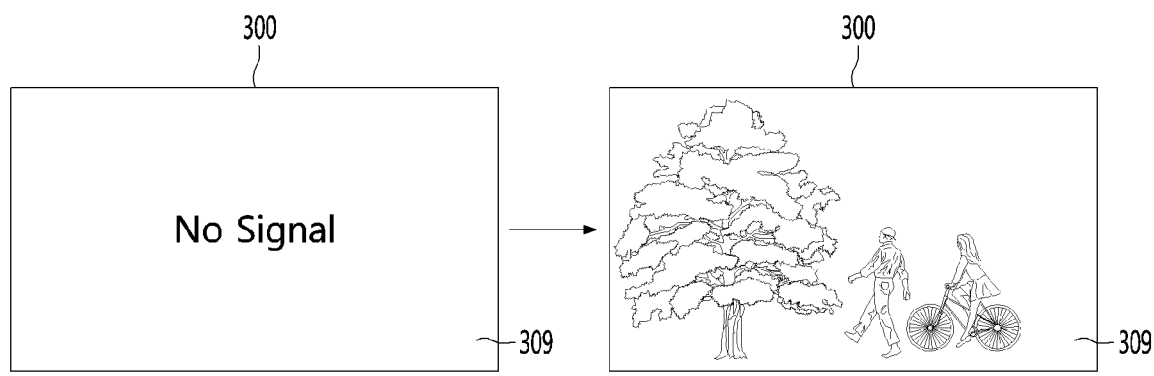
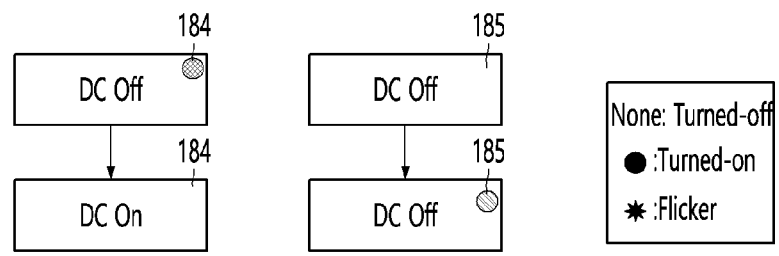

FIG. 23
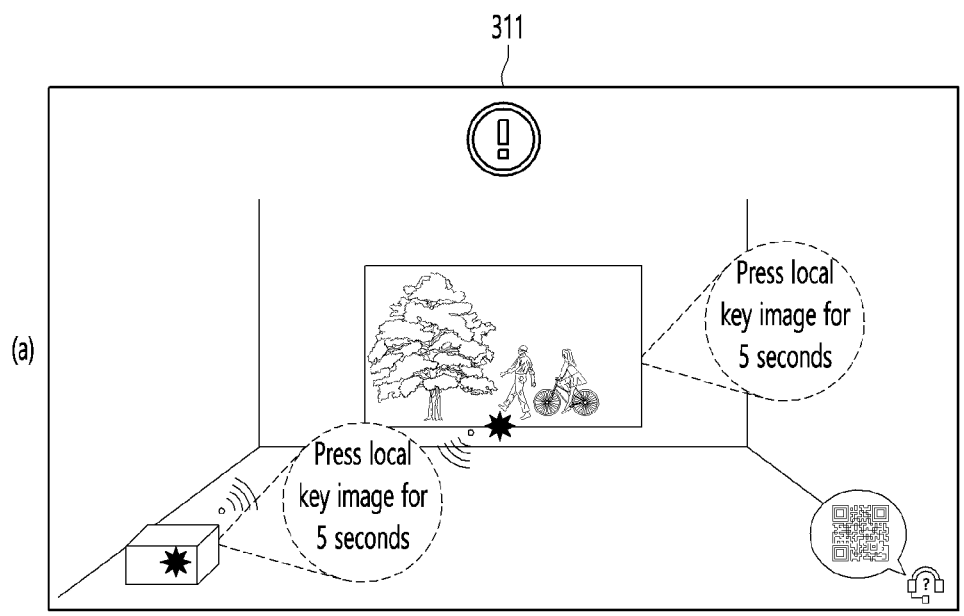
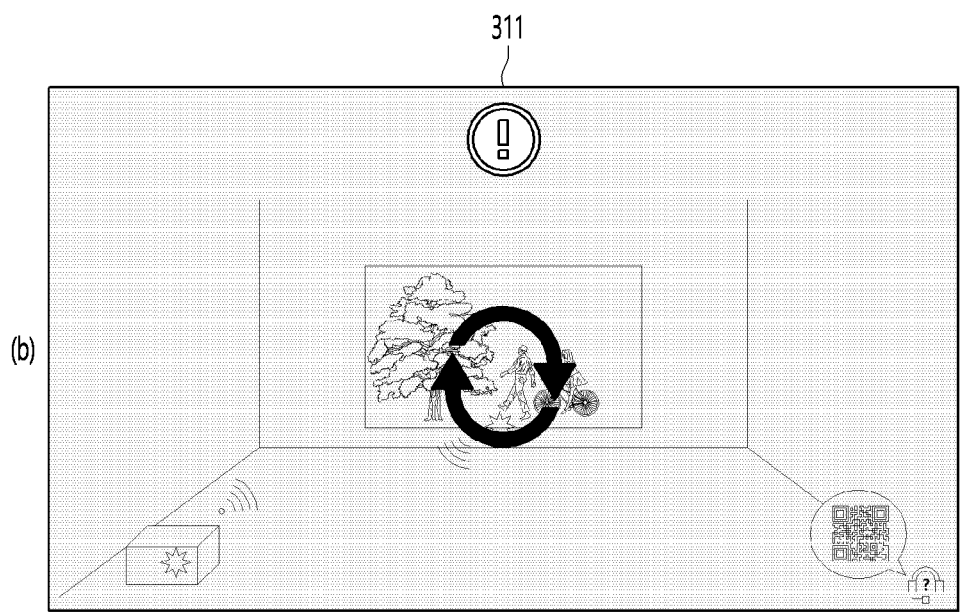

WIRELESS DISPLAY SYSTEM

CROSS-REFERENCE TO RELATED APPLICATIONS

This application is the National Stage filing under 35 U.S.C. 371 of International Application No. PCT/KR2021/005741, filed on May 7, 2021, the contents of which are all incorporated by reference herein in their entirety.

TECHNICAL FIELD

The present disclosure relates to a wireless display system.

BACKGROUND ART

As user' interest in design and aesthetics of a display device such as TVs increases, a thickness of a display device becomes thinner, and recently, a wireless display system in which a reception module provided with a screen, on which an image is displayed, and a transmission module, which receives the image to transmit the image to the reception module, are separated from each other has appeared.

Thus, in the case of the wireless display system, only the reception module may be installed in a wall, and the transmission module provided with other components may be provided in a living room cabinet or a chest of a drawer. Thus, since only the screen is displayed on the wall or the like, a separate line or the like is not connected to improve aesthetics.

However, since the image is wirelessly transmitted and received in the wireless display system, there may be a problem in that the image is cut off depending on wireless communication environments. Here, if the user is not notified that the problem is caused by the wireless communication environments, the user may misunderstand the problem as a problem of the device.

DISCLOSURE OF THE INVENTION

Technical Problem

An object of the present disclosure is to display a guide when wireless communication is not connected in a wireless display system so as to guide a cause of a problem to a user.

Another object of the present disclosure is to display a solution guide according to each problem when the problems occur, and store only a guide related to disconnection of wireless communication in a reception module so as to minimize a thickness of the reception module.

Another object of the present disclosure is to provide a wireless display system in which wireless communication is connected between a transmission module and a reception module to minimize a signal interference.

Technical Solution

According to an embodiment of the present disclosure, when wireless communication is not connected, a guide to be displayed may be stored in a reception module itself.

A wireless display system according to an embodiment of the present disclosure may include a reception module including a display and a memory, a transmission module configured to transmit/receive an image signal and a control signal to/from the reception module, wherein the reception module may be configured to display a guide stored in the memory on the display when wireless communication with the transmission module is not connected.

When signal strength of the wireless communication is weak, the reception module may be configured to receive a guide for setting a wireless communication connection environment from the transmission module so as to display the guide.

The wireless communication may include first wireless communication for receiving the image signal from the transmission module and second wireless communication for receiving the control signal from the transmission module, and the display may be configured to display at least one guide stored in the memory when at least one of the first wireless communication or the second wireless communication is not connected.

When the first wireless communication is not connected, the display may be configured to display different guides when the second wireless communication is not connected and when a pairing error occurs between the transmission module and the reception module.

The display may be configured to: display a guide for adjusting an installation environment of the transmission module or the reception module when the first wireless communication is not connected; and display a guide for turning off the second wireless communication of a peripheral device or a guide for repairing when the wireless communication is not connected.

The display may be configured to display a guide for requesting power check of the transmission module before displaying a guide for turning off the second wireless communication of a peripheral device.

The first wireless communication may be WiGig, and the second wireless communication may be Bluetooth.

When the display displays the guide, a position of the guide may be changed every predetermined period.

The reception module may be configured to: display the guide while the wireless communication with the transmission module is not connected; and display an image received from the transmission module when the wireless communication with the transmission module is connected.

The transmission module may include: a first LED module configured to display power or an error status; and a second LED module configured to display a status of the wireless communication.

A reception module according to an embodiment of the present disclosure may include: an AV reception unit configured to receive an image signal from a transmission module; a wireless communication unit configured to receive a control signal from the transmission module; a display configured to display an image based on the image signal; and a memory, wherein the display may be configured to display a guide stored in the memory when wireless communication with the transmission module is not connected.

Advantageous Effects

According to the embodiment of the present disclosure, since the guide to be displayed when wireless communication is not connected is stored in the reception module, there may be the advantage of displaying the guide for the wireless communication connection.

According to an embodiment of the present disclosure, since only the guide for the wireless communication connection is stored in the reception module, there may be the advantage of minimizing the memory of the reception module and thus minimizing the thickness of the reception module.

According to the embodiment of the present disclosure, since the guide for solving other problems except for the disconnection of the wireless communication is transmitted from the transmission module to the reception module and displayed, there may be the advantage of providing the guide in the various languages.

According to the embodiment of the present disclosure, since the video signal and the control signal are transmitted and received through the different wireless communication, there may be the advantage of minimizing the signal interference.

According to the embodiment of the present disclosure, since the different guides are provided for each problem when the problems occur, there may be the advantage of improving the problem solving accuracy and reducing the required time to improve the user convenience.

According to the embodiment of the present disclosure, there may be the advantage of guiding the various information to the user through the display and the LED module.

BRIEF DESCRIPTION OF THE DRAWINGS

FIG. 7 is a view illustrating an example of a method for operating an LED module when power of a wireless display system is turned on according to an embodiment of the present disclosure.

FIG. 9 is a view illustrating an example of a method for operating the LED module when pairing between the transmission module and a reception module is performed according to an embodiment of the present disclosure.

FIG. 11 is a view illustrating an example of a method for operating the LED module when there is no input signal is the wireless display system according to an embodiment of the present disclosure.

FIG. 23 is a view illustrating an example of a guide displayed for repairing through the reception module according to an embodiment of the present disclosure.

MODE FOR CARRYING OUT THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

It will be understood that the terms "first" and "second" are used herein to describe various components but these components should not be limited by these terms. These terms are used only to distinguish one component from other components.

The terms of a singular form may include plural forms unless referred to the contrary.

In this application, the terms "comprises" or "having" are intended to indicate that there is a feature, number, step, operation, component, part, or combination thereof described in the specification, and one or more other features. It is to be understood that the present invention does not exclude the possibility of the presence or the addition of numbers, steps, operations, components, components, or a combination thereof.

Figure 1:
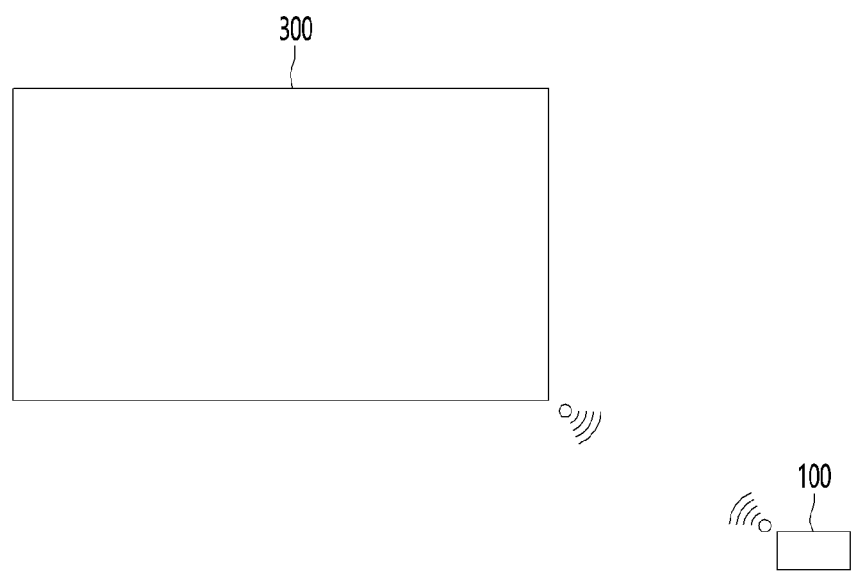
FIG. 1 is a view of a wireless display system.

FIG. 1 is a view of a wireless display system.

A wireless display system may include a reception module 300 and a transmission module 100.

The reception module 300 may be installed to be fixed to a wall or the like.

A screen on which an image is displayed may be provided in the reception module 300. The reception module 300 may include a display 307 (see FIG. 2) for displaying the image.

The display 307 may be implemented as any one of various panels. For example, the display 307 may include any one of a liquid crystal display panel (LCD panel), an organic light emitting panel (OLED panel), and an inorganic light emitting panel (LED panel).

The reception module 300 may receive an AV signal (audio/video signal) from the transmission module 100 and display an image on the display 307 through the received AV signal.

The AV signal may include an audio signal and a video signal.

The reception module 300 may wirelessly receive the AV signal from the transmission module 100. For example, the reception module 300 and the transmission module 100 may transmit and receive the AV signal in a 60 GHz band. However, since a frequency band in which the reception module 300 and the transmission module 100 transmit and receive the AV signal is merely an example, it is not limited thereto.

When receiving the AV signal from the transmission module 100, the reception module 300 may also receive a control signal for an image control.

The transmission module 100 may be disposed to be spaced apart from the reception module 300. That is, since the reception module 300 and the transmission module 100 transmit and receive signals wirelessly, a position of the transmission module 100 may be flexible.

The transmission module 100 may be disposed in an opened space. Alternatively, the transmission module 100 may be disposed inside a living room cabinet or a chest of a drawer. In this case, since the transmission module 100 is covered by the living room cabinet or the chest of the drawer, an installation environment of the wireless display system may be created more neatly.

Figure 2:
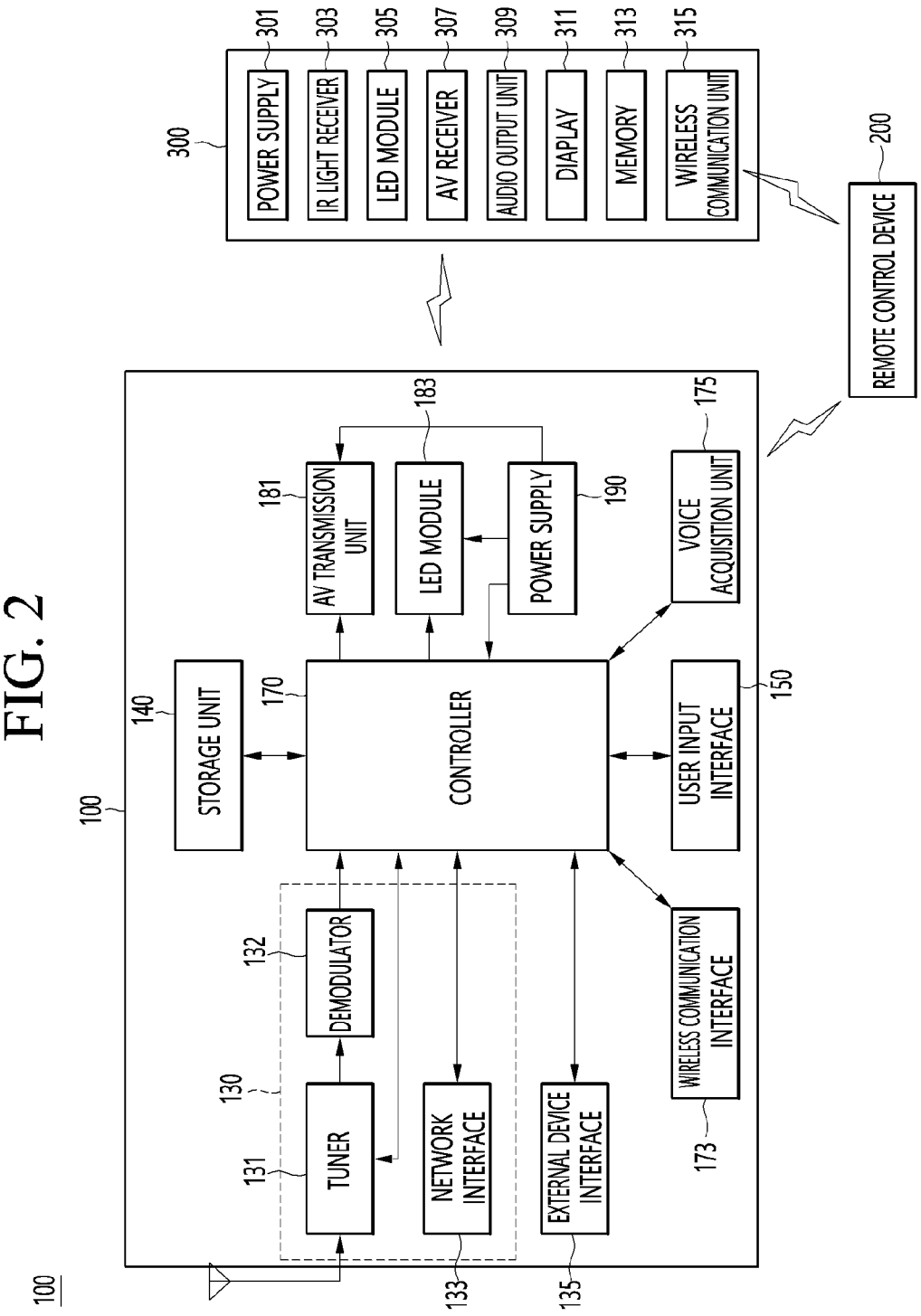
FIG. 2 is a control block diagram of the wireless display system of FIG. 1.

At least one of the reception module 300 or the transmission module 100 may receive a control signal from a remote control device 200 (see FIG. 2). A user may control the wireless display system using the remote control device 200.

For example, the reception module 300 and the transmission module 100 may receive a power ON/OFF signal from the remote control device 200 and may control power according to the received power ON/OFF signal.

According to an embodiment, the reception module 300 may receive the control signal from the remote control device 200, and the reception module 300 may transmit the control signal received from the remote control device 200 to the transmission module 100.

As a specific example, the reception module 300 may receive the control signal from the remote control device 200 as IR (infrared), and the reception module 300 may transmit the control signal received from the remote control device 200 to the transmission module 100 through Bluetooth BT.

When the Bluetooth connection between the reception module 300 and the transmission module 100 is disconnected, the remote control device 200 may directly transmit the control signal to the transmission module 100 through Bluetooth. Here, the remote control device 200 may be a device capable of Bluetooth communication.

FIG. 2 is a control block diagram of the wireless display system of FIG. 1.

First, a method of transmitting and receiving a signal between the transmission module 100, the reception module 300, and the remote control device 200 will be described.

The remote control device 200 may transmit a control signal for turning on or off the power to the wireless display system. Particularly, the remote control device 200 may transmit a power on/off signal to the reception module 300 through infrared (IR). The reception module 300 may receive a signal for controlling power from the remote control device 200 through the IR.

When receiving the signal for controlling power from the remote control device 200, the reception module 300 may transmit the received power control signal to the transmission module 100. Particularly, the reception module 300 may transmit the power control signal to the transmission module 100 through the BT (Bluetooth). As the transmission module 100 receives the power control signal, the power may be turned on or off.

When the power is turned on, the reception module 300 may transmit and receive the control signal to/from the remote control device 200 through RF (radio frequency). Particularly, the reception module 300 and the remote control device 200 may transmit and receive control signals through the BT of RF, but this is merely an example and is not limited thereto. The control signal transmitted and received between the reception module 300 and the remote control device 200 may include various information such as voice data and motion data.

In addition, the transmission module 100 may transmit the AV signal to the reception module 300, and the AV signal may be transmitted in a 60 GHz band. In addition, a separate communication channel may be provided between the transmission module 100 and the reception module 300 so that the control signal is transmitted. The transmission module 100 may transmit the control signal received from the remote control device 200 to the reception module 300 through the communication channel. In addition, according to an embodiment, the transmission module 100 may transmit the control signal received from the remote control device 200 to the reception module 300 through the BT in addition to the communication channel.

Since the wireless communication method between the transmission module 100, the remote control device 200 and the reception module 300, that is, communication in the IR, BT, RF and 60 GHz bands is merely an example, it is reasonable not to be limited thereto. However, for convenience of description, a communication method for transmitting the AV signal between the transmission module 100 and the reception module 300 is referred to first wireless communication, and a communication method for transmitting the control signal between the transmission module 100 and the reception module 300 is referred to second wireless communication. In some cases, the first wireless communication and the second wireless communication may be the same or different.

According to an embodiment, if the first wireless communication between the transmission module 100 and the reception module 300 is disconnected, the reception module 300 may not display an image on a screen. If the user who does not know that the first wireless communication is disconnected continues to press a key of the remote control device 200 because the image is not displayed, a problem may not be solved, and unintended results may be caused. Therefore, when the disconnection of the first wireless communication is detected, even if the control signal is not received from the remote control device 200, the transmission module 100 may not transmit the control signal received from the remote control device 200 to the reception module 300. That is, when the first wireless communication is disconnected, the transmission module 100 may ignore the control signal received from the remote control device 200.

Next, each configuration of the transmission module 100, the reception module 300, and the remote control device 200 will be described in detail.

Referring to FIG. 2, the transmission module 100 may include a broadcast reception unit 130, an external device interface 135, a storage unit 140, a user input interface 150, a controller 170, a wireless communication interface 173, a voice acquisition unit 175, an AV transmission unit 181, an LED module 183, and a power supply 190.

The broadcast reception unit 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The network interface 133 may provide an interface for connecting the transmission module 100 to a wired/wireless network including Internet network. The network interface 133 may transmit or receive data to or from another user or another electronic device through an accessed network or another network linked to the accessed network.

The network interface 133 may access a predetermined Webpage through an accessed network or another network linked to the accessed network. That is, it may transmit or receive data to or from a corresponding server by accessing a predetermined Webpage through network.

Then, the network interface 133 may receive contents or data provided from a content provider or a network operator. That is, the network interface 133 may receive contents such as movies, advertisements, games, VODs, and broadcast signals, which are provided from a content provider or a network provider, through network and information relating thereto.

Additionally, the network interface 133 may receive firmware update information and update files provided from a network operator and transmit data to an Internet or content provider or a network operator.

The network interface 133 may select and receive a desired application among applications open to the air, through network.

The external device interface 135 may receive an application or an application list in an adjacent external device and deliver the application or the application list to the controller 170 or the storage unit 140.

The external device interface 135 may provide a connection path between the transmission module 100 and an external device. The external device interface 135 may receive at least one of an image or audio outputted from the external device that is wirelessly or wiredly connected to the transmission module 100 and transmit the received image or the audio to the controller 170. The external device interface 135 may include a plurality of external input terminals. The plurality of external input terminals may include an RGB terminal, at least one High Definition Multimedia Interface (HDMI) terminal, and a component terminal.

An AV signal of the external device input through the external device interface 135 may be transmitted to the reception module 300 through the AV transmission unit 181.

The external device that is connectible to the external device interface 135 may be any one of a set-top box, a Blu-ray player, a DVD player, a game console, a sound bar, a smartphone, a PC, a USB memory, and a home theater, but this is merely an example.

In addition, some content data stored in the transmission module 100 may be transmitted to a user or an electronic device, which is selected from other users or other electronic devices pre-registered in the transmission module 100.

The storage unit 140 may store signal-processed image, voice, or data signals stored by a program in order for each signal processing and control in the controller 170.

In addition, the storage unit 140 may perform a function for temporarily store image, voice, or data signals outputted from the external device interface 135 or the network interface 133 and may store information on a predetermined image through a channel memory function.

The storage unit 140 may store an application or an application list input from the external device interface 135 or the network interface 133.

The transmission module 100 may play content files (for example, video files, still image files, music files, document files, application files, and so on) stored in the storage unit 140 to transmit the played content files to the reception module 300.

The user input interface 150 may deliver signals input from a user to the controller 170 or transmit signals from the controller 170 to the user. For example, the user input interface 150 may receive or process control signals such as power on/off, channel selection, and screen setting from the remote control device 200 or transmit control signals from the controller 170 to the remote control device 200 according to various communication methods such as Bluetooth, ultra wideband (WB), ZigBee, radio frequency (RF), and IR.

Additionally, the user input interface 150 may deliver, to the controller 170, control signals input from local keys (not shown) such as a power key, a channel key, a volume key, and a setting key.

The image signal that is image-processed by the controller 170 may be input to the AV transmission unit 181 and transmitted to the reception module 300. In addition, the image signal that is image-processed in the controller 170 may be input to an external output device through the external device interface 135.

The audio signal processed by the controller 170 may be input to the AV transmission unit 181 and transmitted to the reception module 300. In addition, the audio signal processed in the controller 170 may be input to an external output device through the external device interface 135.

In addition, the controller 170 may control an overall operation in the transmission module 100.

In addition, the controller 170 may control the transmission module 100 by a user command or internal program inputted through the user input interface 150 and download a desired application or application list into the transmission module 100 in access to network.

The controller 170 may input channel information selected by the user together with the processed video or audio signal to the AV transmission unit 181 so as to be transmitted to the reception module 300.

In addition, according to an external device image playback command received through the user input interface 150, the controller 170 may receive the image signal or audio signal of the external device such as a camera or a camcorder, which are inputted through the external device interface 135, through the AV transmission unit 181 so as to be transmitted to the reception module 300.

The controller 170 may control the AV transmission unit 181 so that the video signal is transmitted to the reception module 300. For example, the controller 170 may control the AV transmission unit 181 so that a broadcasting image input through the tuner 131, an external input image input through the external device interface unit 135, an image input through the network interface, or an image stored in the storage unit 140 are transmitted to the reception module 300. In this case, an image displayed on the reception module 300 may be a still image or video and also may be a 2D image or a 3D image.

In addition, the controller 170 may control the AV transmission unit 181 so that content stored in the transmission module 100, received broadcast content, and external input content input from the outside are transmitted to the reception module 300. Here, the content may be in various forms, such as a broadcast image, an external input image, an audio file, a still image, a connected web screen, and a document file.

Moreover, the wireless communication interface 173 may perform a wired or wireless communication with an external electronic device. The wireless communication interface 173 may perform short-range communication with an external device. For this, the wireless communication interface 173 may support short-range communication by using at least one of Bluetooth™, radio frequency Identification (RFID), infrared data association (IrDA), ultra wideband (UWB), ZigBee, near field communication (NFC), wireless-fidelity (Wi-Fi), Wi-Fi direct, and wireless universal serial bus (USB) technologies. The wireless communication interface 173 may support wireless communication between the transmission module 100 and a wireless communication system, between the transmission module 100 and another transmission module 100, or between networks comprising the transmission module 100 and another transmission module 100 (or an external server) through wireless area networks. The wireless area networks may be wireless personal area networks.

Herein, the other transmission module 100 may be a mobile terminal such as a wearable device (for example, a smart watch, a smart glass, and a head mounted display (HMD)) or a smartphone, which is capable of exchanging data (or inter-working) with the transmission module 100. The wireless communication interface 173 may detect (or recognize) a communicable wearable device around the transmission module 100. Furthermore, if the detected wearable device is a device authenticated to communicate with the transmission module 100, the controller 170 may transmit at least part of data processed in the transmission module 100 to the wearable device through the wireless communication interface 173. Accordingly, a user of the wearable device may use the data processed in the transmission module 100 through the wearable device.

The voice acquisition unit 175 may acquire audio. The voice acquisition unit 175 may include at least one microphone (not shown) and may acquire audio around the transmission module 100 through the microphone (not shown).

The AV transmission unit 181 may transmit the AV signal processed by the controller 170 to the reception module 300.

The transmission module 100 illustrated in FIG. 2 may be merely an example of the present disclosure, and thus, some of the illustrated components may be integrated, added, or omitted according to the specification of the actually implemented transmission module 100.

That is, if necessary, two or more components may be integrated into one component or one component may be divided into two or more components and configured. In addition, a function performed by each block is to describe an embodiment of the present disclosure and its specific operation or device does not limit the scope of the present disclosure.

According to another embodiment of the present disclosure, unlike FIG. 2, the transmission module 100 may receive an image through the network interface 133 or the external device interface 135 to play the received image without including the tuner 131 and the demodulator 132.

For example, the transmission module 100 may be divided into an image processing device such as a set-top box for receiving broadcast signals or contents according to various network services and a content playback device for playing contents input from the image processing device.

In this case, a method of operating the wireless display system according to an embodiment of the present disclosure, which is described to be described below, may be performed by any one of an image processing device such as a separate set-top box or a content playback device provided with a display and an audio output unit.

The LED module 183 may output a state of the transmission module 100 to at least one LED. The LED module 183 may be provided in plurality.

The power supply 190 supplies corresponding power throughout the transmission module 100. Particularly, power may be supplied to the controller 170, which is capable of being implemented in the form of a system on chip (SOC), the AV transmission unit 181, or the LED module 183.

Specifically, the power supply 190 may include a converter that converts AC power to DC power and a DC/DC converter that converts a level of the DC power.

The reception module 300 may receive the AV signal from the transmission module 100 and display an image using the received AV signal.

The reception module 300 includes at least some or all of a power supply 301, an IR light receiver 303, an LED module 305, an AV receiver 307, an audio output unit 309, a display 311, a memory 313, and a wireless communication unit 315. Since the configurations of the reception module 300 illustrated in FIG. 2 are merely examples for description, some of the configurations illustrated in FIG. 2 may be omitted, or other configurations may be further added.

The power supply 301 may supply power that is necessary for an operation of the reception module 300. The power supply 301 may receive power from the outside to supply the power to at least one of the IR light receiver 303, the LED module 305, the AV receiver 307, the audio output unit 309, and the display 311.

The IR light receiver 303 may receive an IR signal. For example, the IR light receiver 303 may receive a control signal for controlling the wireless display system from the remote control device 200 as the IR signal.

The LED module 305 may output a state of the wireless display system, in particular, the reception module 300 to an LED.

The AV receiver 307 may receive the AV signal from the transmission module 100. That is, the AV receiver 307 may receive at least one of an audio signal or a video signal from the transmission module 100.

The audio output unit 309 may receive an audio-processed signal from the transmission module 100 through the AV receiver 307 to output the received signal as an audio.

The display 311 may receive an image signal that is image-processed from the transmission module 100 through the AV receiver 307 to display the image signal as an image.

The memory 313 may store data that is necessary for the operation of the reception module 300.

According to an embodiment, the memory 313 may store a guide to be displayed on the display 311 when wireless communication between the transmission module 100 and the reception module 300 is not connected.

The wireless communication unit 315 may transmit/receive a control signal to/from the transmission module 100.

For example, the wireless communication unit 315 may transmit and receive a control signal to and from the transmission module 100 through Bluetooth.

Figure 3:
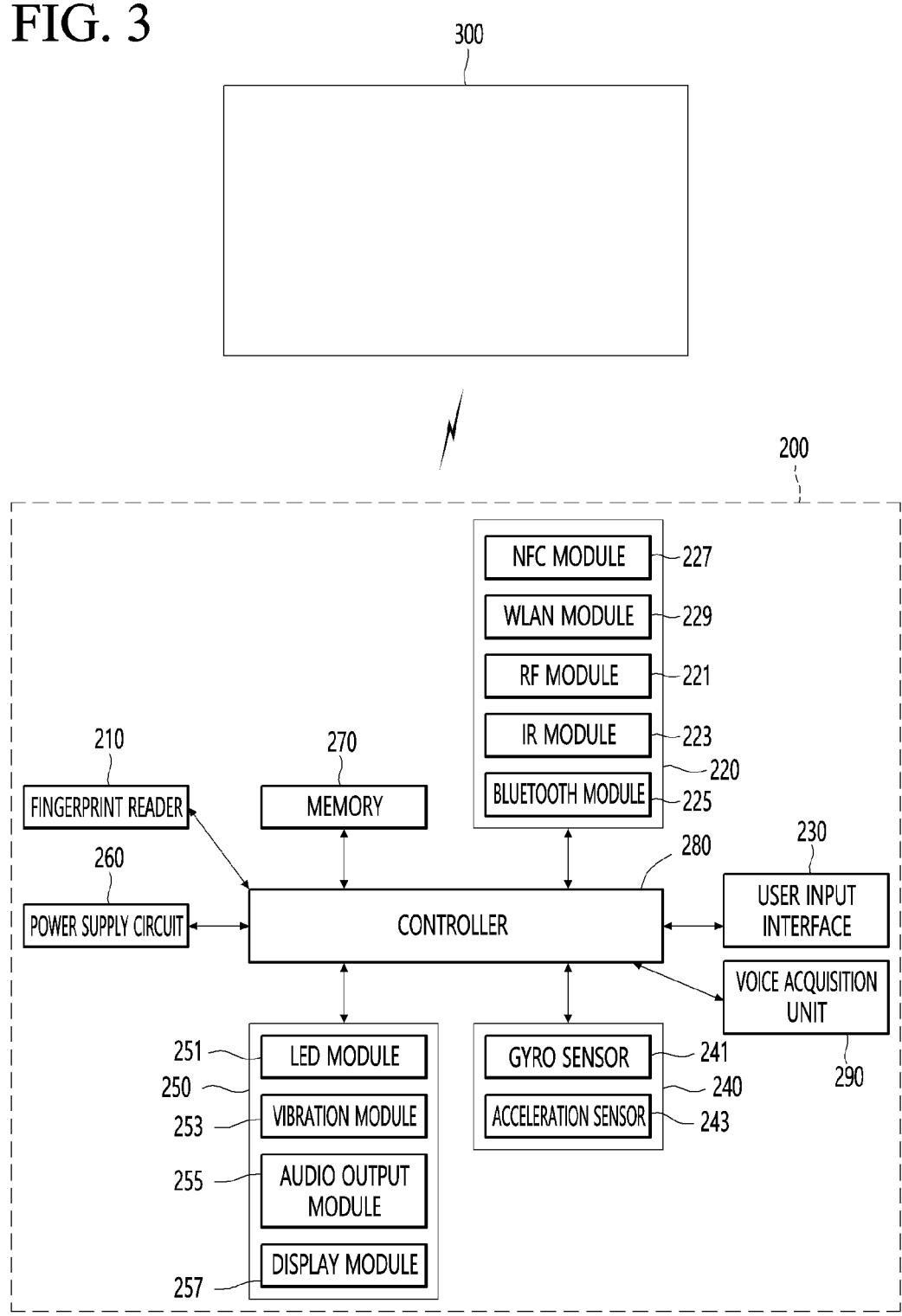
FIG. 3 is a block diagram of a remote control device according to an embodiment of the present disclosure.
Figure 4:
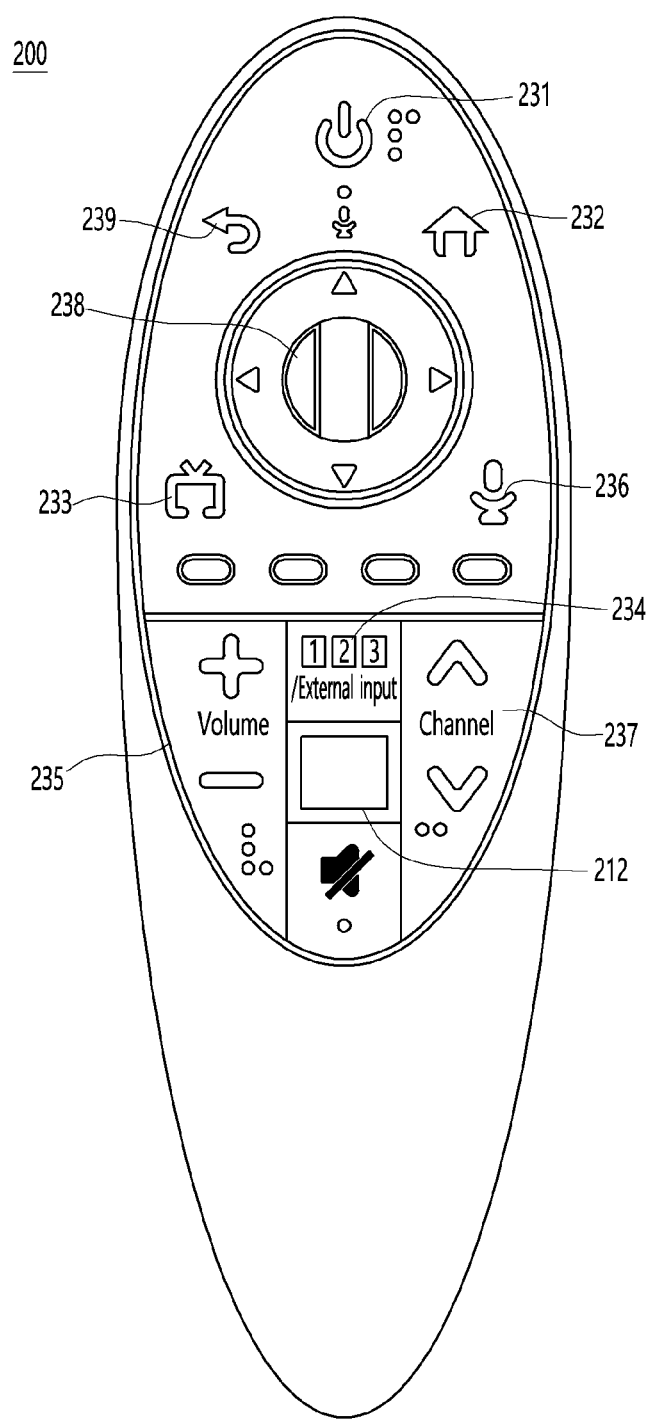
FIG. 4 is a view illustrating an actual configuration of the remote control device according to an embodiment of the present disclosure.

Then, referring to FIGS. 3 and 4, the remote control device is described according to an embodiment of the present disclosure.

FIG. 3 is a block diagram of a remote control device according to an embodiment of the present disclosure, and FIG. 4 shows an actual configuration example of a remote control device 200 according to an embodiment of the present disclosure.

First, referring to FIG. 3, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 3, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC module 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 4.

Referring to FIG. 4, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

A description will be given referring again to FIG. 3.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100. The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200. When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 5.

FIG. 4 shows an example of using a remote control device according to an embodiment of the present disclosure.

Figure 5:
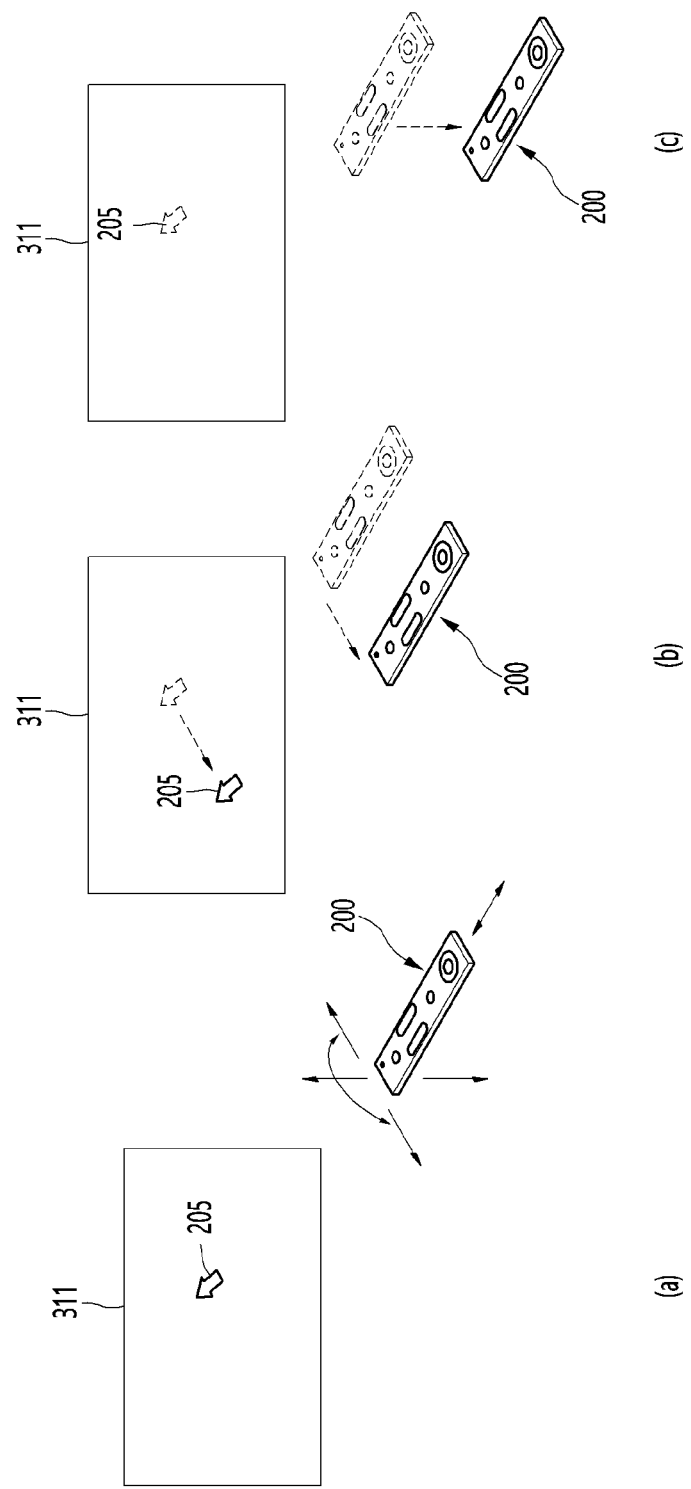
FIG. 5 is a view illustrating an example of utilizing the remote control device according to an embodiment of the present disclosure.

In FIG. 5, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 5, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 5, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 6:
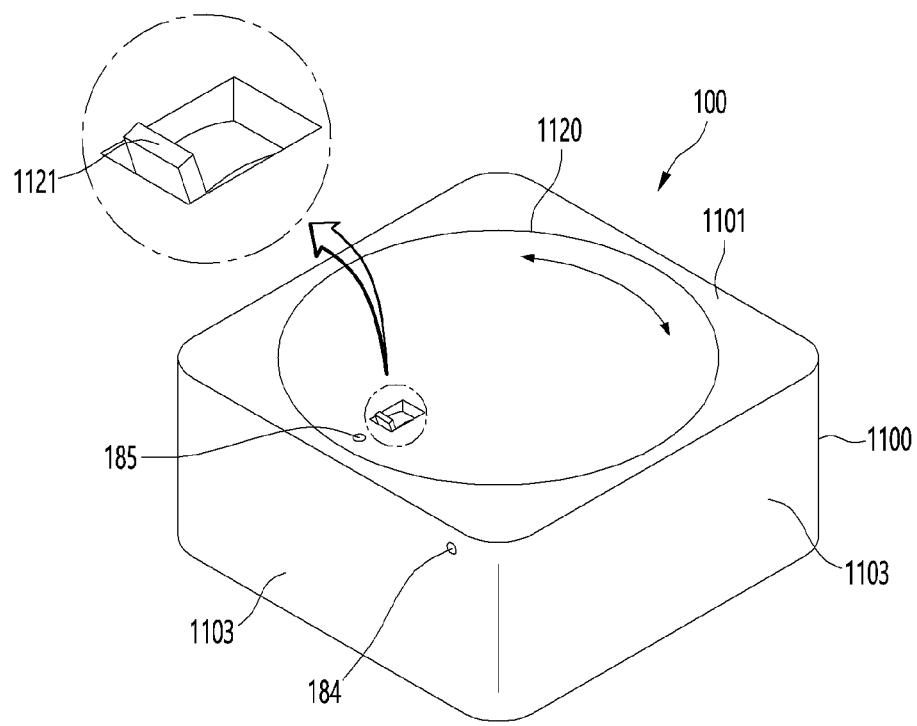
FIG. 6 is a perspective view of a transmission module according to an embodiment of the present disclosure.

FIG. 6 is a perspective view of the transmission module according to an embodiment of the present disclosure.

Since the shape of the transmission module 100 illustrated in FIG. 6 is merely an example for description, this embodiment may not to be limited thereto.

The transmission module 100 may be provided in a hexahedral shape. For example, the transmission module 100 may include a case 1100 having a hexahedral shape. An SoC in which a controller 170, an AV transmission unit 181, and the like are integrated may be disposed inside the case 1100. The case 1100 may be provided with a top surface 1101, a bottom surface (not shown), and four side surfaces 1103.

A rotating plate 1120 may be installed on the top surface 1101 of the case 1100. The rotating plate 1120 may rotate in a clockwise or counterclockwise on the top surface 1101.

In addition, at least one LED module 185 may be installed on the rotating plate 1120. In addition, the LED module 184 may be installed on the side surfaces 1103. That is, the LED module 183 of the transmission module 100 may include a plurality of LED modules. For example, the LED module 183 may include first and second LED modules. Here, the first LED module 184 may be installed on each of the side surfaces 1103, and the second LED module 185 may be installed on the top surface 1101. However, since the number and location of the LED modules are merely illustrative, this embodiment may not to be limited thereto.

The second LED module 185 may be installed on the rotating plate 1120 to rotate together as the rotating plate 1120 rotates.

In addition, the AV transmission unit 181 may be installed adjacent to the second LED module 185. Thus, when the rotating plate 1120 rotates, the AV transmission unit 181 may rotate together, and as a result, a signal transmission direction of the AV transmission unit 181 may be changed together.

In addition, a lever 1121 may be installed on the rotating plate 1120. The lever 1121 may adjust an angle at which the AV transmitter 181 transmits a signal. The angle at which the AV transmission unit 181 transmits the signal may vary according to a position of the lever 1121.

The first LED module 184 may display power and error situations, and the second LED module 185 may display a wireless signal situation.

The first LED module 184 and the second LED module 185 may be disposed on different surfaces. For example, the first LED module 184 may be disposed on the side surface 1103, and the second LED module 185 may be disposed on the upper surface. When the first LED module 184 and the second LED module 185 are disposed on different surfaces, if the user checks a situation of the wireless display system through the LED module from a distance, it may minimize difficulty of distinguishing which LED module is displaying which situation. Particularly, since the first LED module 184 for displaying a power or error situation is disposed on the side surface 1103, there may be an advantage in that the user watching an image from a distance may easily check the situation. In addition, since the second LED module 185 for displaying the wireless signal status is disposed on the upper surface 1101, there is an advantage in that information is checked only when the user needs the information.

An LED module 305 may also be installed in the reception module 300. For example, the LED module 305 may be installed on one surface or at one side of the display 311, but this is merely an example, and the position of the LED module 305 may vary.

Next, referring to FIGS. 7 to 13, a method for operating an LED module provided in a wireless display system according to an embodiment of the present disclosure will be described.

In the present specification, power off may refer to a standby state in which an electronic device is connected to an external power source (e.g., a socket), but a screen is turned off, and only minimum power is used so that the electronic device is operable according to a user input. That is, the power off has to be distinguished from a state in which the electronic device is not connected to the external power source.

In addition, the LED modules 309, 184, and 185 may output light when turned on and may not output light when turned off. The LED modules 309, 184, and 185 may adjust a color of the light output when turned on and an output method of the light. For example, the color of the light may be red, yellow, or green, and the output method of the light may be a continuous output method or a flickering output method, but this is merely an example and is not limited thereto. It is assumed that the light is continuously output unless otherwise specified in relation to the output method.

FIG. 7 is a view illustrating an example of the method for operating the LED module when power of the wireless display system is turned on according to an embodiment of the present disclosure.

When the power of the reception module 300 is switched from the turn-off to turn-on, the LED module 309 may be switched from the turn-on to the turn-off. That is, when the power of the reception module 300 is turned off, the LED module 309 may be turned on, and when the power of the reception module 300 is turned on, the LED module 309 may be turned off. Therefore, when the power of the reception module 300 is turned on, the LED module 309 may not output light.

Similarly, when the power of the transmission module 100 is switched from the turn-off to the turn-on, the first LED module 184 may be switched from the turn-on to the turn-off. That is, the first LED module 184 may be turned on when the power of the transmission module 100 is turned off, and may be turned off when the power of the transmission module 100 is turned on.

When the power of the transmission module 100 is turned off, the second LED module 185 is turned off, and when the power of the transmission module 100 is turned on, the second LED module 185 may be turned on together. The second LED module 185 may output light in various manners according to a wireless communication state while the transmission module 100 is turned on. For example, the wireless communication state may include wireless signal strength. Specifically, the second LED module 185 may operates in a first mode when the wireless signal strength is strong, operate in a second mode when the wireless signal strength is normal, and operate in a third mode when the wireless signal strength is weak or disconnected.

Here, the first mode may be a mode in which green light is output, the second mode may be a mode in which yellow light is output, and the third mode may be a mode in which red light is output while flickering, but this is merely exemplary.

Figure 17:
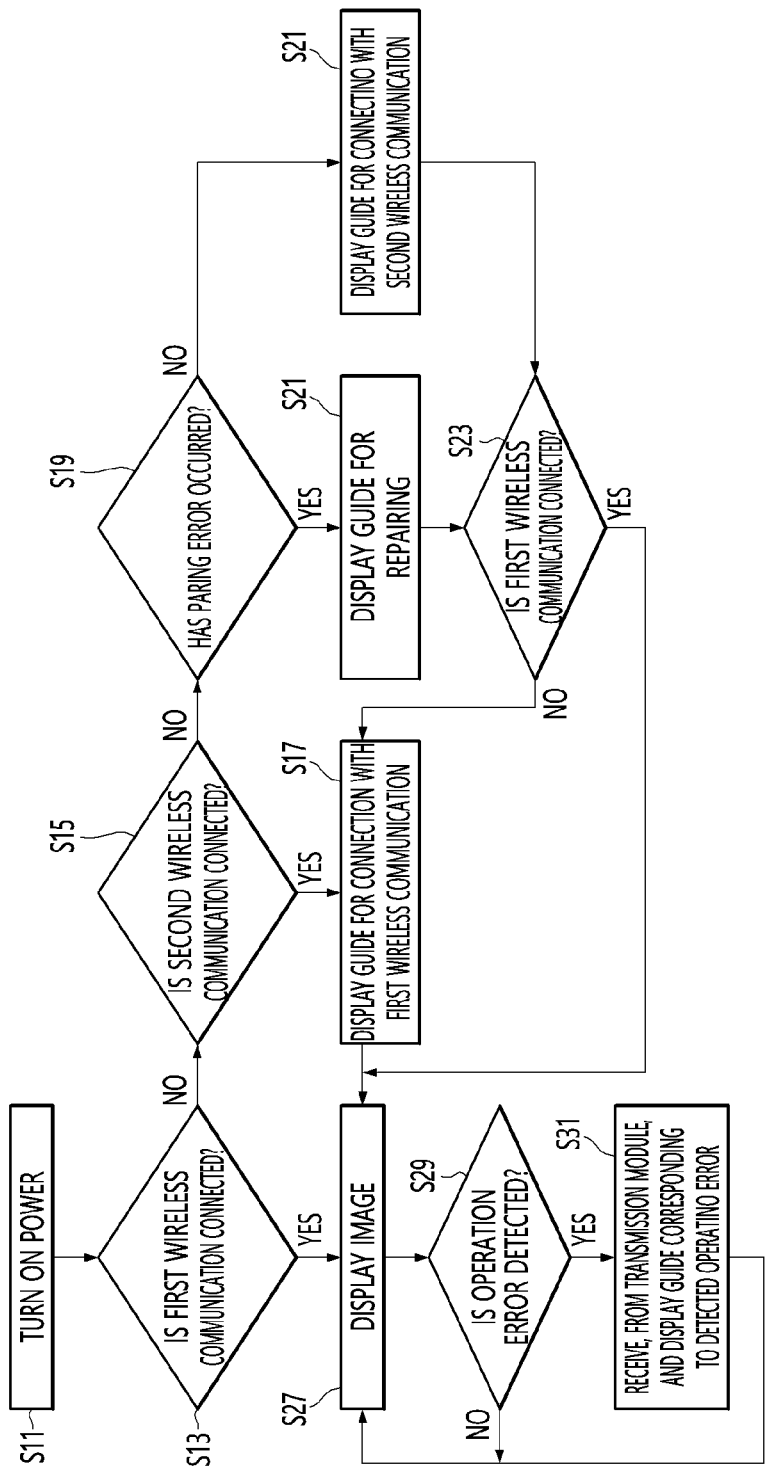
FIG. 17 is a flowchart illustrating a method for operating the wireless display system according to an embodiment of the present disclosure.

The wireless communication state may refer to a state of the wireless communication for transmitting and receiving the AV signal between the transmission module 100 and the reception module 300, and in this case, the wireless communication may refer to first wireless communication in FIG. 17. The first wireless communication will be described in detail with reference to FIG. 17.

Figure 8:
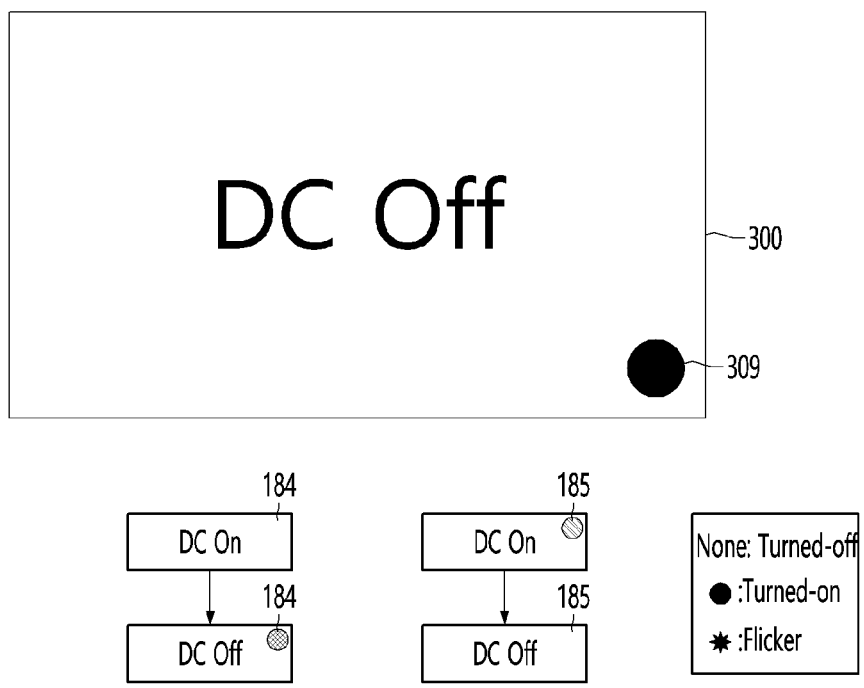
FIG. 8 is a view illustrating an example of a method for operating the LED module when the power of the wireless display system is turned off according to an embodiment of the present disclosure.

FIG. 8 is a view illustrating an example of a method for operating the LED module when the power of the wireless display system is turned off according to an embodiment of the present disclosure.

When the power of the reception module 300 is switched from the turn-on to turn-off, the LED module 309 may be switched from the turn-off to the turn-on. When the power of the reception module 300 is turned off, the LED module 309 may be turned on, and when the power of the reception module 300 is turned on, the LED module 309 may be turned off. Thus, when the power of the reception module 300 is turned off, the LED module 309 may output light.

Similarly, when the power of the transmission module 100 is switched from the turn-on to the turn-off, the first LED module 184 may be switched from the turn-off to the turn-on. For example, the first LED module 184 may output red light as the power of the transmission module 100 is turned off.

When the power of the transmission module 100 is switched from turn-on to the turn-off, the second LED module 184 may be switched from the turn-on to the turn-off. Specifically, while the second LED module 185 outputs light in various modes based on the wireless communication state while the power of the transmission module 100 is turned on, it may not output light when the power of the transmission module 100 is turned off. That is, when the power of the transmission module 100 is turned off, the second LED module 185 may also be turned off.

FIG. 9 is a view illustrating an example of a method for operating the LED module when pairing between the transmission module and the reception module is performed according to an embodiment of the present disclosure.

While the reception module 300 enters a pairing mode, the LED module 309 may output flickering light, and in particular, the light may be red, but this is merely an example. Then, when the reception module 300 completes pairing, the LED module 309 may not output light. Here, the pairing may referred to an operation in which the reception module 300 and the transmission module 100 are connected to each other.

The first LED module 184 of the transmission module 100 may output the flickering light while entering the pairing mode and may not output light when the pairing is completed. Here, the light may be green light, but this is merely an example.

In addition, the second LED module 185 of the transmission module 100 may not output light while entering the pairing mode and may output light when the pairing is completed. After the pairing is completed, the color of light output from the second LED module 185 may vary depending on the wireless communication state.

Figure 10:
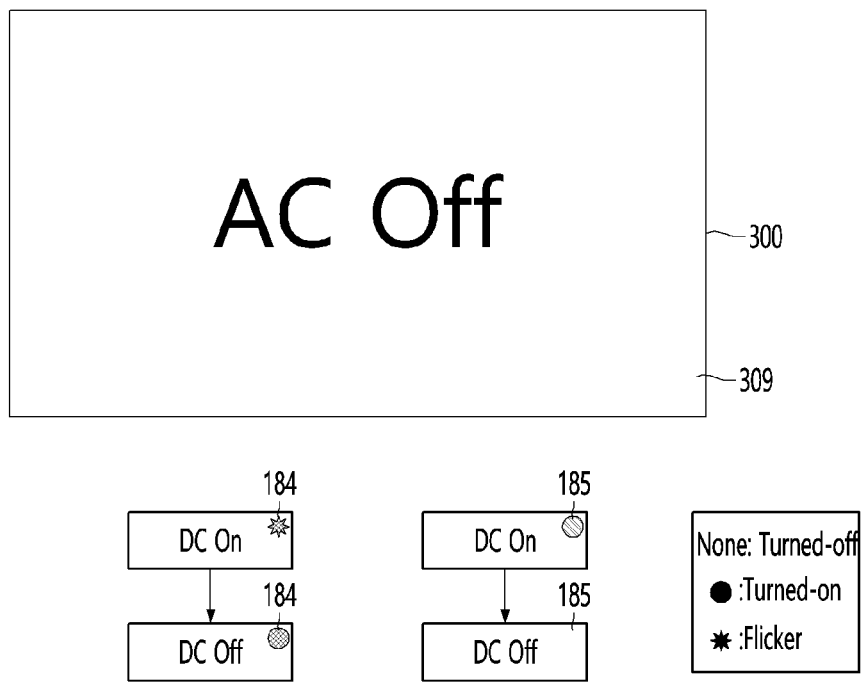
FIG. 10 is a view illustrating an example of a method for operating the LED module when the reception module of the wireless display system is not connected to an external power source according to an embodiment of the present disclosure.

FIG. 10 is a view illustrating an example of a method for operating the LED module when the reception module of the wireless display system is not connected to an external power source according to an embodiment of the present disclosure.

When the reception module 300 is not connected to the external power source, the LED module 309 may be turned off.

Since the reception module 300 is not connected to the external power source, even if the remote control device 200 transmits a control signal for the turn-on of the power, the reception module 300 may not operate.

The transmission module 100 may operate according to a command received from the remote control device 200 when connected to the external power source.

When the reception module 300 is not connected to the external power source, and the power of the transmission module 100 is turned on, the first LED module 184 of the transmission module 100 may output red flickering light. Here, the color of light is merely an example. When compared to the example of FIG. 8, the first LED module 184 of the transmission module 100 may output the flickering light to inform that the reception module 300 is not connected to the external power source to the user.

When the reception module 300 is not connected to the external power source, and the power of the transmission module 100 is turned off, the first LED module 184 may output red light.

The second LED module 185 of the transmission module 100 may output light in various manners according to the wireless communication state, which is the same as described in FIG. 7.

FIG. 11 is a view illustrating an example of a method for operating the LED module when there is no input signal is the wireless display system according to an embodiment of the present disclosure.

Even if an input signal is not detected, when the reception module 300 is turned on, the LED module 309 may be turned off. That is, the LED module 309 of the reception module 300 may operate according to the power state of the reception module 300 regardless of the input signal.

Similarly, the first and second LED modules 184 and 185 of the transmission module 100 may operate regardless of the input signal. That is, when the power of the transmission module 100 is turned off, the first LED module 184 may be turned on, and when the power of the transmission module 100 is turned on, the first LED module 184 may be off. In addition, when the power of the transmission module 100 is turned off, the second LED module 185 may be turned off, and when the power of the transmission module 100 is turned on, the second LED module 185 may output light according to the wireless communication state.

Figure 12:
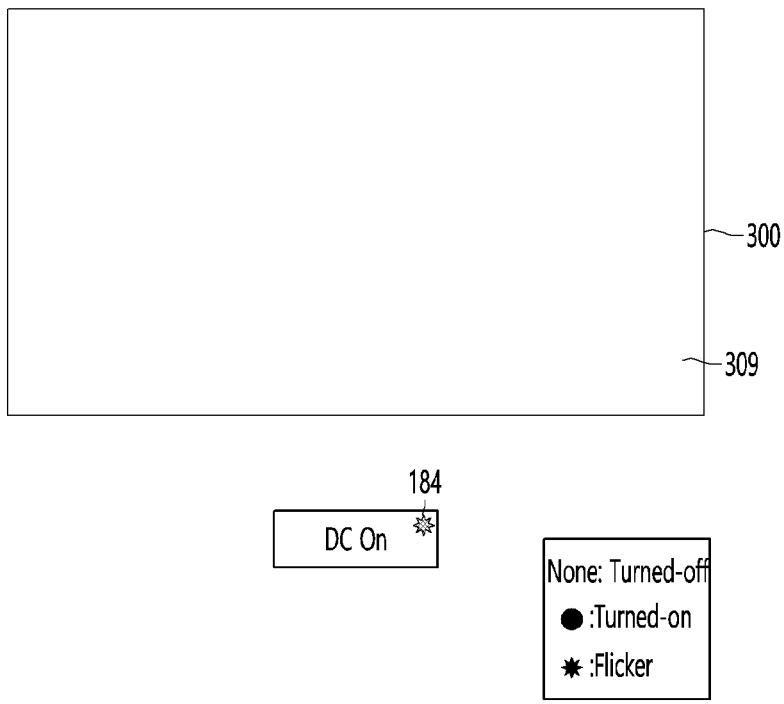
FIG. 12 is a view illustrating an example of a method for operating the LED module when the wireless display system is overheated according to an embodiment of the present disclosure.

FIG. 12 is a view illustrating an example of a method for operating the LED module when the wireless display system is overheated according to an embodiment of the present disclosure.

When the overheating is detected, the transmission module 100 may output red light in which the first LED module 184 flickers. For example, the transmission module 100 may include a temperature sensor (not shown), and the controller 170 may control a first LED module 184 so that red light is output while blinking when the sensing temperature of the temperature sensor (not shown) is equal to or higher than a predetermined reference temperature.

Figure 13:
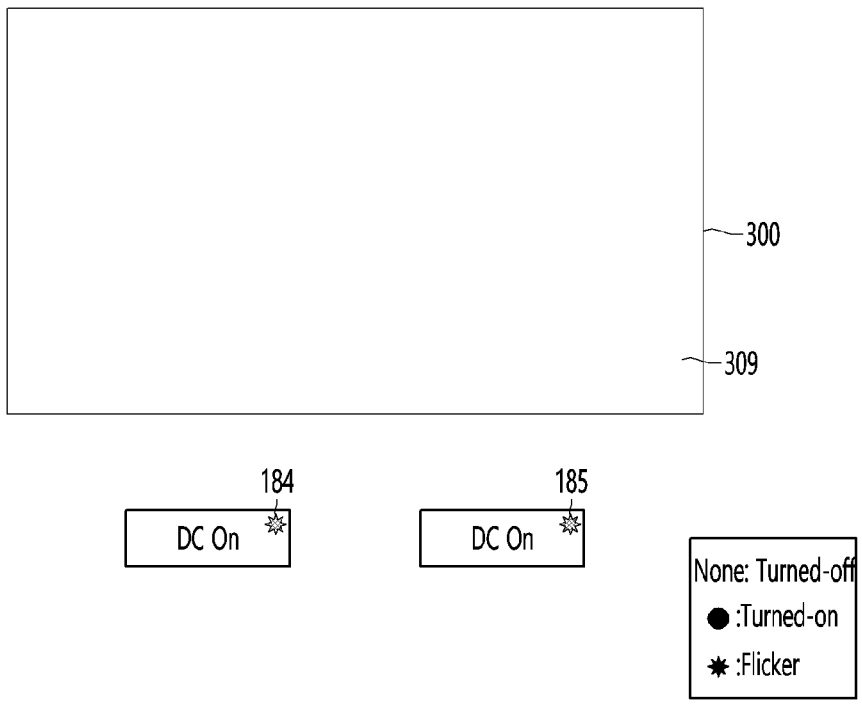
FIG. 13 is a view illustrating an example of a method for operating the LED module when an error in wireless data transmission occurs in the wireless display system according to an embodiment of the present disclosure.

FIG. 13 is a view illustrating an example of a method for operating the LED module when an error in wireless data transmission occurs in the wireless display system according to an embodiment of the present disclosure.

The transmission module 100 may emit the red light, in which each of the first LED module 184 and the second LED module 185 flickers when the wireless communication with the reception module 300, in particular, the first wireless communication to be described later is not connected.

Since the method of operating the LED module described with reference to FIGS. 7 to 13 is merely an example, this embodiment is not limited thereto.

As described through the examples of FIGS. 7 to 13, the wireless display system may inform the situations such as power, error, and wireless communication through LED modules to the user.

The wireless display system may guide various information to the user through the display 311. For example, the display 311 may display an initial setting guide screen when the wireless display system is installed.

Figure 14:
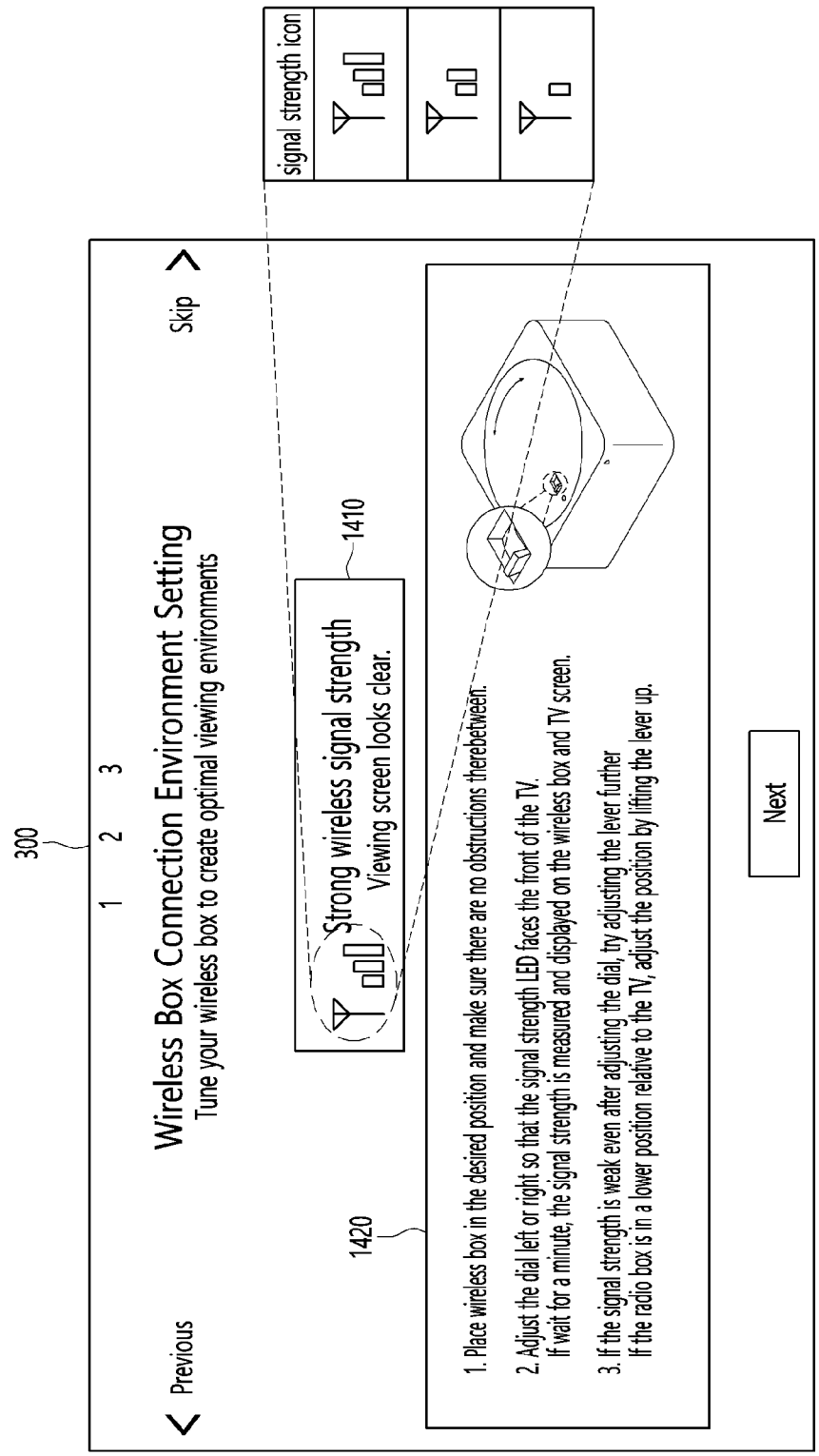
FIG. 14 is a view illustrating an example of an initial setting guide screen displayed on the wireless display system according to an embodiment of the inventive concept.

FIG. 14 is a view illustrating an example of the initial setting guide screen displayed on the wireless display system according to an embodiment of the inventive concept.

For example, the display 311 may initially display the initial setting guide screen as illustrated in FIG. 14 when the wireless display system is installed.

As in the example of FIG. 14, the initial setting guide screen may display wireless communication state information 1410 and an installation guide 1420.

The wireless communication state information 1410 may include wireless signal strength between the transmission module 100 and the reception module 300, in particular, signal strength of the first wireless communication described later. For example, the wireless communication state information 1410 may include an icon representing the wireless signal strength.

The installation guide 1420 may include a text or image guiding an installation position of the transmission module 100. Since the reception module 300 is fixed to a wall or the like, the information guiding the position of the transmission module 100 may be contained in the installation guide 1420 so that the signal is smoothly transmitted/received to/from the reception module 300. For example, the installation guide 1420 may guide the transmission module 100 and the reception module 300 so that there is no obstruction between the transmission module 100 and the reception module 300, may guide the rotating plate 1120 to be adjusted so that the second LED module 185 that guides the wireless communication state faces the reception module 300, or may include at least one of the text or the image so that the lever 1121 is adjusted with reference to the wireless communication state information 1410. However, since the initial setting guide screen of FIG. 14 is merely an example, this embodiment may not be limited thereto.

The initial setting guide screen may also be displayed through a terminal connected to the wireless display system. Here, the terminal may mean a portable electronic device such as a smart phone.

Figure 15:
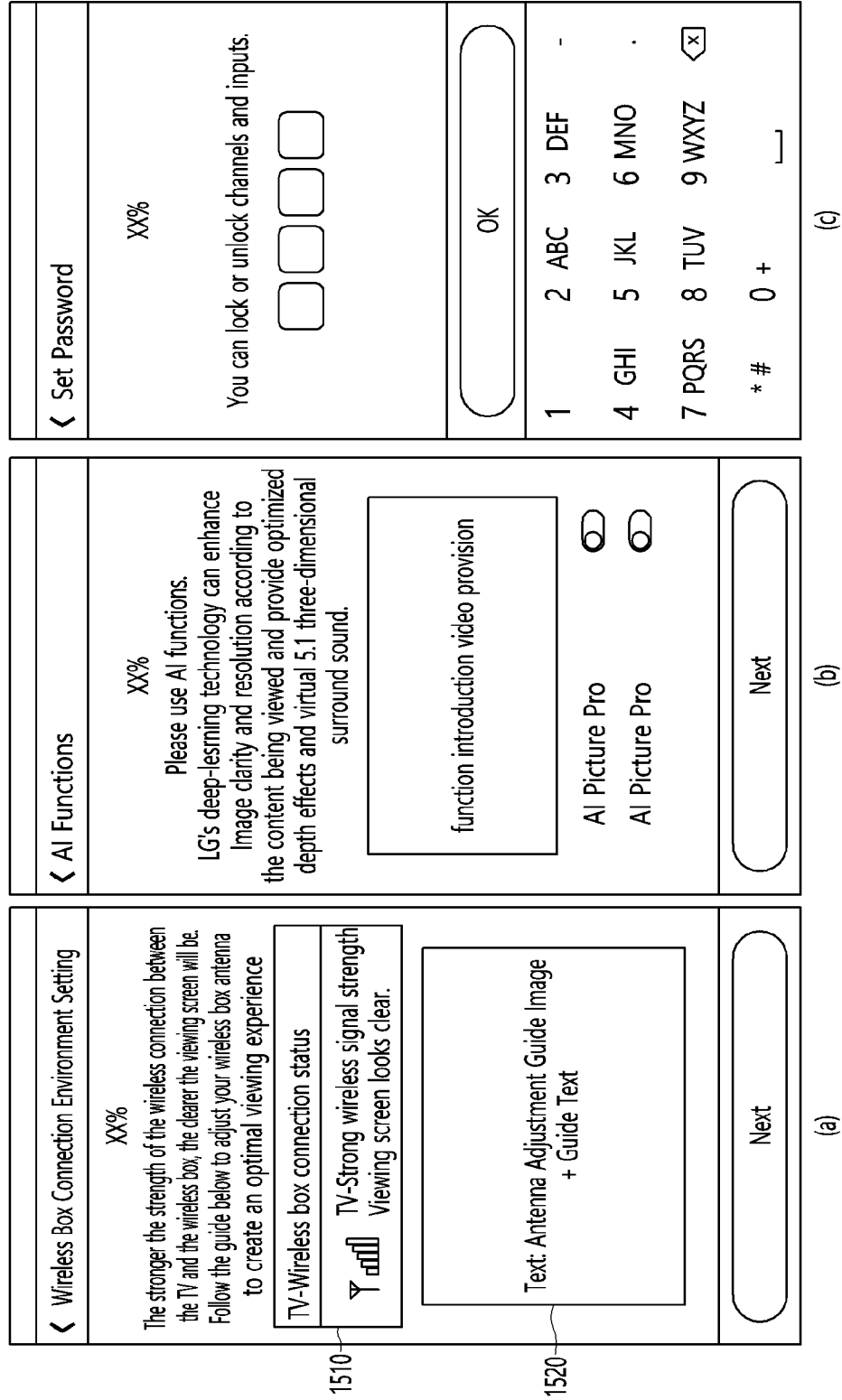
FIG. 15 is a view illustrating an example of an initial setting guide screen displayed by a terminal connected to the wireless display system according to an embodiment of the present disclosure.

FIG. 15 is a view illustrating an example of the initial setting guide screen displayed by the terminal connected to the wireless display system according to an embodiment of the present disclosure.

Particularly, (a) of FIG. 15 illustrates an example of the initial setting guide screen displayed by the terminal.

The terminal may display the initial setting guide screen as illustrated in (a) of FIG. 15, and the initial setting guide screen may include wireless communication state information 1510 and an installation guide 1520. Since each of the wireless communication state information 1510 and the installation guide 1520 is the same as the wireless communication state information 1410 and the installation guide 1420 described in FIG. 14, duplicate descriptions will be omitted. That is, although the text or image is omitted in the installation guide 1520 of FIG. 15, at least one of the text or image shown in the installation guide 1420 of FIG. 14 may be contained.

The terminal may further display various function setting screens in addition to the initial setting guide screen. For example, the function setting screen may include an artificial intelligence function setting screen as illustrated in (b) of FIG. 15 and a password setting screen as illustrated in (c) of FIG. 15.

The artificial intelligence function setting screen may be a screen for setting at least one of an artificial intelligence image quality setting function or an artificial intelligence sound quality setting function. The password setting screen may be a screen for setting a password for locking or unlocking a channel or an input.

However, the screens illustrated in FIG. 15 are merely examples, and the terminal may display various screens for setting functions related to the wireless display system or controlling the wireless display system.

The wireless display system may display a screen for setting a wireless communication connection environment even after the initial setting.

Figure 16:
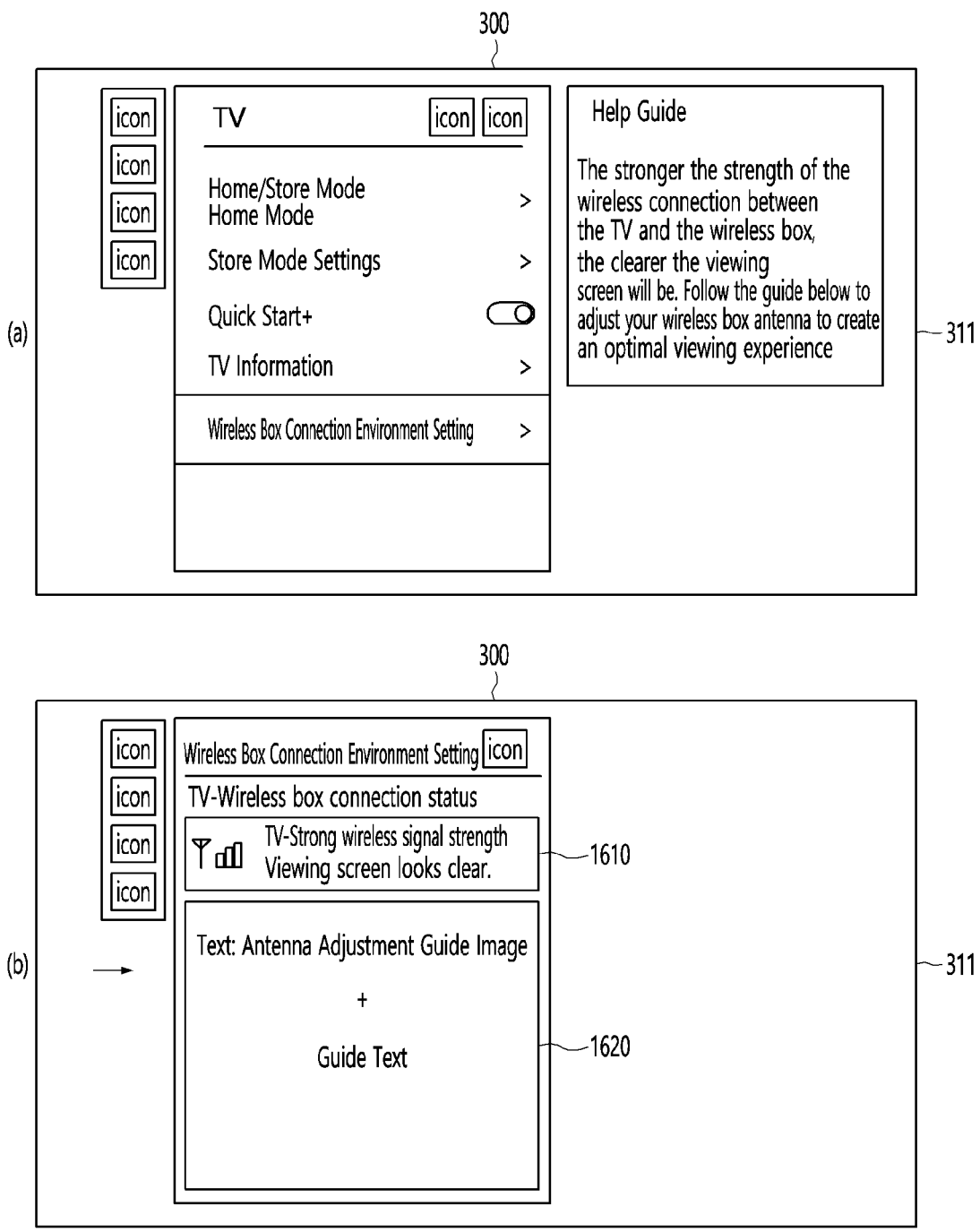
FIG. 16 is a view illustrating an example of a screen for explaining a wireless communication connection environment displayed on the wireless display system according to an embodiment of the inventive concept.

FIG. 16 is a view illustrating an example of a screen for explaining the wireless communication connection environment displayed on the wireless display system according to an embodiment of the inventive concept.

For example, as illustrated in (a) of FIG. 16, the display 311 may display a menu for setting various functions related to the use of the wireless display system. At least one of the menus may be an item for setting the wireless communication connection environment.

When the item for setting the wireless communication connection environment is selected, the display 311 may display a screen containing the wireless communication state information 1610 and the installation guide 1620 as illustrated in (b) of FIG. 16. Since each of the wireless communication state information 1610 and the installation guide 1620 is the same as the wireless communication state information 1410 and the installation guide 1420 described in FIG. 14, duplicate descriptions will be omitted. That is, although the text or image is omitted in the installation guide 1620 of FIG. 16, at least one of the text or image shown in the installation guide 1420 of FIG. 14 may be contained.

In the wireless display system, since the transmission module 100 and the reception module 300 transmit and receive signals wirelessly, an connection error in wireless communication may occur. Thus, the wireless display system according to an embodiment of the present disclosure may detect the connection error of the wireless communication and display a guide for removing the error. Particularly, since the wireless display system according to an embodiment of the present disclosure uses a plurality of wireless communication technologies, it is intended to accurately and quickly remove errors by displaying an error elimination guide suitable for the wireless communication technology in which the error occurs.

FIG. 17 is a flowchart illustrating a method for operating the wireless display system according to an embodiment of the present disclosure.

Power of at least one of the transmission module 100 or the reception module 300 may be turned on (S11).

At least one of the transmission module 100 and the reception module 300 may switch the power from turn-off to turn-on as a power on signal is received.

At least one of the transmission module 100 and the reception module 300 may obtain whether the first wireless communication is connected while the power is turned on (S13).

That is, at least one of the transmission module 100 and the reception module 300 may determine whether the first wireless communication is connected while the power is turned on.

The first wireless communication may refer to a wireless communication method of transmitting an AV signal from the transmission module 100 to the reception module 300. The first wireless communication may refer to a wireless communication method using a band of 60 GHz. For example, the first wireless communication may be WiGig (Wireless Gigabits), IEEE 802.11ay, etc., but is not limited thereto. The second wireless communication to be described later may be Bluetooth (BT). That is, the first wireless communication may use a frequency of about 60 GHz, and the second wireless communication may use a frequency band of about 2.4 to 2.485 GHz. However, this is merely an example and is not limited thereto.

As described above, the transmission module 100 and the reception module 300 may transmit and receive a signal through a plurality of wireless communication, for example, the first wireless communication and the second wireless communication described later. Specifically, the transmission module 100 and the reception module 300 may transmit and receive the AV signal through the first wireless communication and may transmit and receive the signal (e.g., control signal) excluding the AV signal through the second wireless communication. As described above, there is an advantage of minimizing a signal interference by distinguishing between wireless communication for transmitting and receiving the AV signal and wireless communication for transmitting and receiving other signals. Particularly, since the AV signal is continuously transmitted and received while the wireless display system is operating, the signal interference may be minimized by using a communication method different from other signals, that is, a different frequency band.

If at least one of the transmission module 100 or the reception module 300 is not connected to the first wireless communication, it is possible to obtain whether the second wireless communication is connected (S15).

At least one of the transmission module 100 or the reception module 300 may determine whether the second wireless communication is connected when the first wireless communication is not connected.

When the second wireless communication is connected, at least one of the transmission module 100 or the reception module 300 may display a guide for the first wireless communication connection (S17).

When the first wireless communication is not connected, the display 311 may be turned on, but a normal screen may not be displayed. That is, when the first wireless communication is not connected, the display 311 may be turned on, but the image may not be normally displayed.

In addition, when the first wireless communication is not connected, the second LED module 183 of the transmission module 100 may output flickering red light.

The display 311 may display a guide for normally connecting the first wireless communication.

The display 311 may display a guide stored in the memory 313 when the reception module 300 and the transmission module 100 are not connected through the first wireless communication. The guide for connection of the first wireless communication may be stored in the memory 313.

Figure 18:
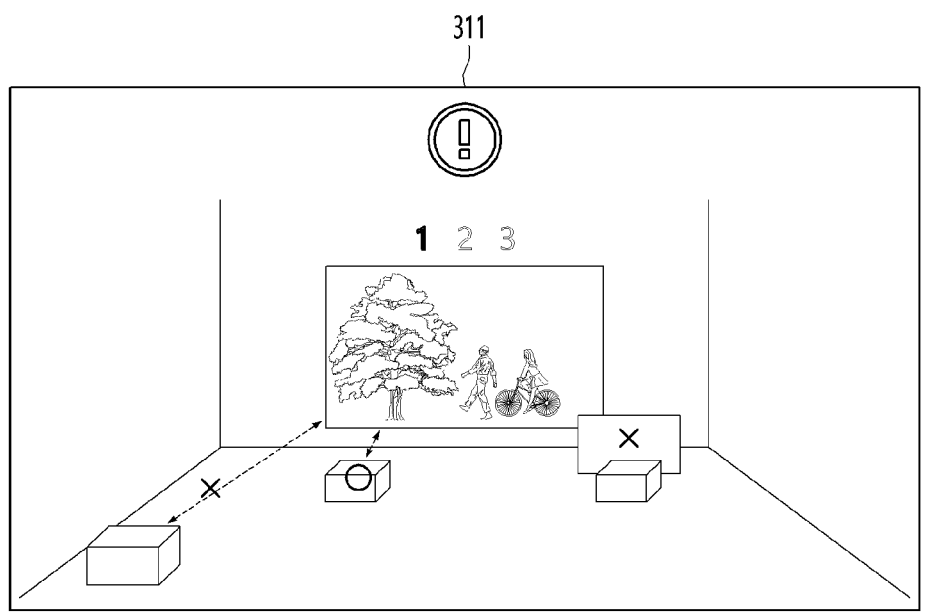
FIGS. 18 to 20 are view illustrating an example of a guide displayed for first wireless communication connection through the reception module according to an embodiment of the present disclosure.
Figure 19:
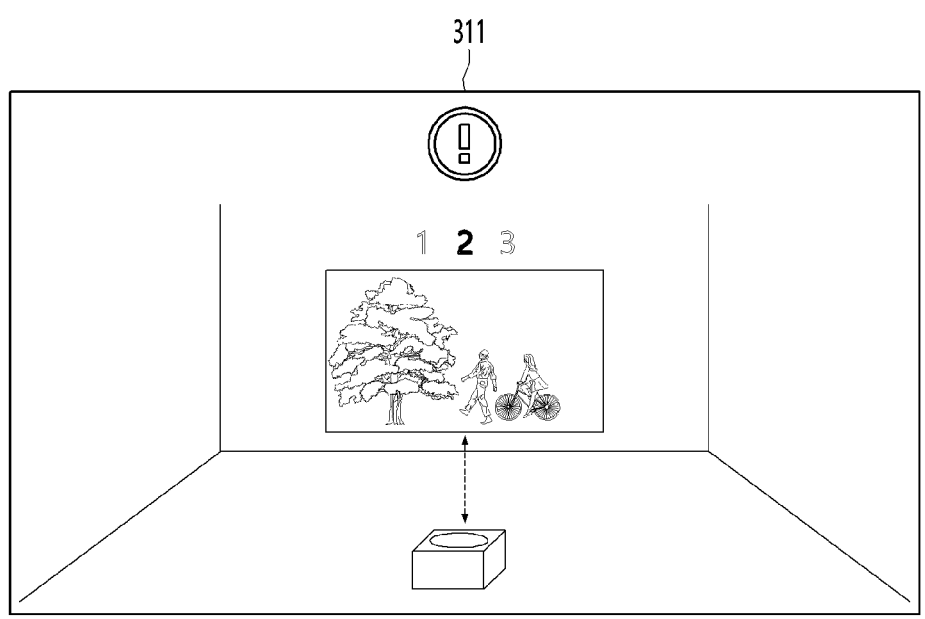
Figure 20:
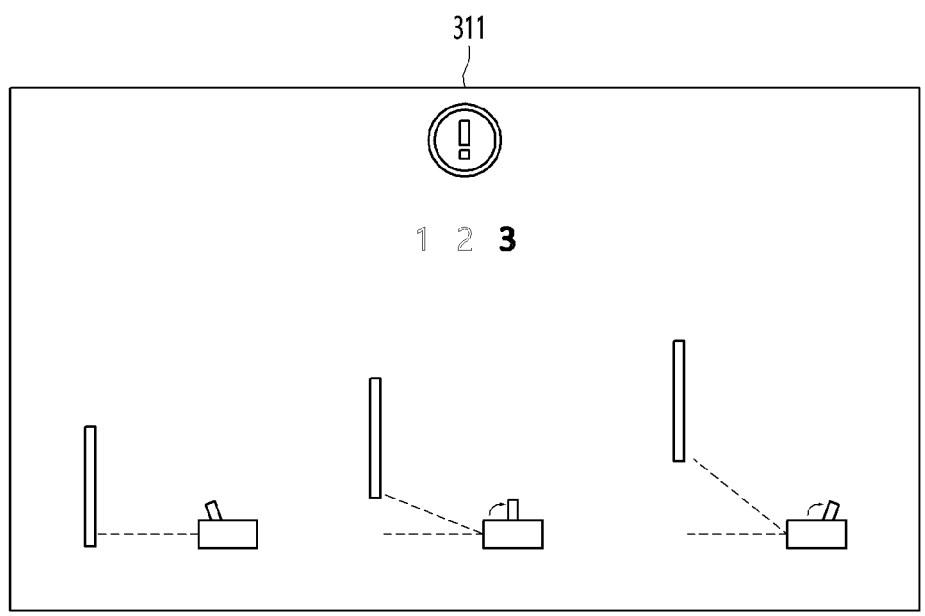

FIGS. 18 to 20 are view illustrating an example of a guide displayed for first wireless communication connection through the reception module according to an embodiment of the present disclosure.

The guide may be a guide for connecting the first wireless communication.

The memory 313 may store one guide, and the display 311 may continuously display the one guide stored in the memory 313 until the first wireless communication is connected.

Alternatively, the memory 313 may store a plurality of guides, and the display 311 may sequentially and repeatedly display the plurality of guides stored in the memory 313 at predetermined periodic intervals until the first wireless communication is connected.

FIG. 18 illustrates an example of a first guide of the plurality of guides, FIG. 19 illustrates an example of a second guide of the plurality of guides, and FIG. 20 is illustrates an example of a third guide of a plurality of guides.

Referring to FIG. 18, the first guide includes at least one of an image instructing that a distance between the transmission module 100 and the reception module 300 is required to be adjusted and an image instructing that an obstacle is required so as not to be placed between the transmission module 100 and the reception module 300.

Referring to FIG. 19, the rotating plate 1120 may be directed toward the reception module 300, and the second guide may include an image instructing that the second LED module 185 is required to be adjusted.

Referring to FIG. 20, the third guide may include an image instructing that the lever 1121 is required to be adjusted so that the second LED module 185 faces the reception module 300.

Since the above-described first to third guides are merely examples, this embodiment is not limited thereto.

The display 311 may display a guide for the first wireless communication connection and may receive and display an image from the transmission module 100 when the connection of the first wireless communication is detected.

Again, FIG. 17 will be described.

If at least one of the transmission module 100 or the reception module 300 is not connected to the second wireless communication, a pairing error may be acquired (S19).

That is, if at least one of the transmission module 100 or the reception module 300 is not connected to the second wireless communication, it may determine whether the pairing error occurs.

When it is determined that at least one of the transmission module 100 or the reception module 300 is not in the state of the pairing error, a guide for the second wireless communication connection may be displayed (S21).

If it does not correspond to the pairing error, it may correspond to a case in which the second wireless communication is temporarily disconnected due to factors such as surrounding environments. Thus, in this case, the display 311 may display a guide for the second wireless communication connection.

When the second wireless communication is not connected, even if the remote control device 200 transmits a control signal, at least one of the transmission module 100 or the reception module 300 may not operate according to the control signal transmitted by the remote control device 200.

If the first wireless communication is connected even though the second wireless communication is not connected, the display 311 may normally output an image.

In addition, since the signal transmitted by the remote control device 200 reacts after being received by the reception module 300 and transmitted to the transmission module 100, if the transmission module 100 is not connected to the external power source, even if the display 311 is normally outputting the image, there may be no reaction according to the signal of the remote control device 200. Thus, even though the transmission module 100 has a power supply problem, it may be mis-recognized as a connection problem of the second wireless communication.

Thus, the display 311 may further display a power check guide of the transmission module 100 before displaying the guide for the second wireless communication connection.

Figure 21:
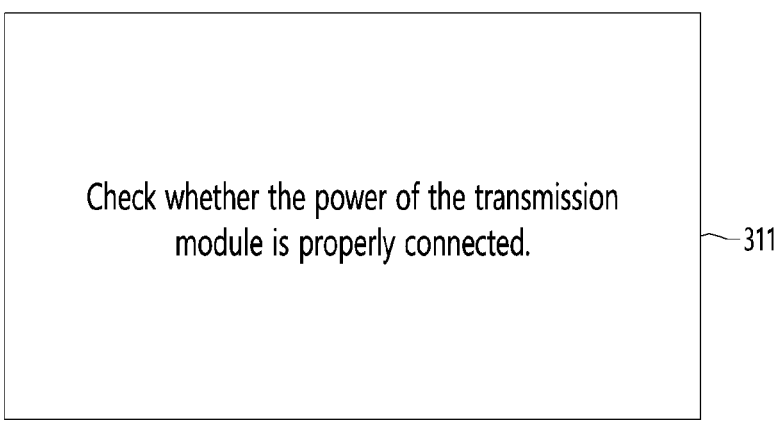
FIG. 21 is a view illustrating example of a guide displayed for checking power of the transmission module through the reception module according to an embodiment of the present disclosure.

FIG. 21 is a view illustrating example of the guide displayed for checking power of the transmission module through the reception module according to an embodiment of the present disclosure.

When displaying the guide for the connection of the second wireless communication, the display 311 may display the guide for checking the power of the transmission module before displaying the guide for the connection of the second wireless communication.

The guide for checking the power of the transmission module may be stored in the memory 313 in the form of an image. As in the example of FIG. 21, the guide for checking the power of the transmission module may include a message requesting the check of the power of the transmission module to the user.

Figure 22:
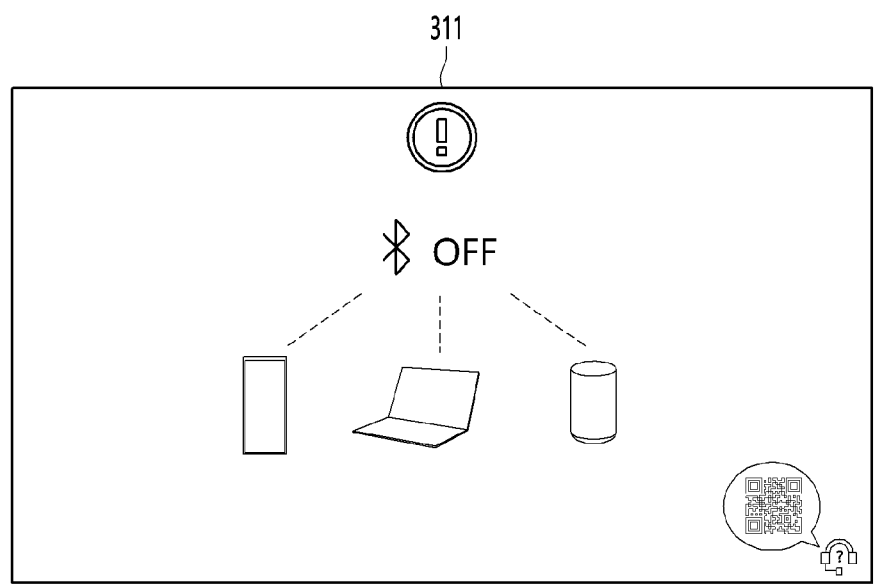
FIG. 22 is a view illustrating an example of a guide displayed for second wireless communication connection through the reception module according to an embodiment of the present disclosure.

After displaying the guide for checking the power of the transmission module, the display 311 may display the guide for the second wireless communication connection as in the example illustrated in FIG. 22.

FIG. 22 is a view illustrating an example of the guide displayed for second wireless communication connection through the reception module according to an embodiment of the present disclosure.

Similarly, the guide for the second wireless communication connection may be stored in the memory 313 in the form of an image. As in the example of FIG. 22, the guide for the second wireless communication connection may include an image (or message) requesting turn-off of second wireless communication of neighboring devices.

Again, FIG. 17 will be described.

The reception module 300 may display the guide for the second wireless communication connection, and when the connection of the second wireless communication is detected, it may be confirmed whether the first wireless communication is connected (S25). Since this is the same as that described in operation S13, redundant description will be omitted.

Again, FIG. 17 will be described.

If at least one of the transmission module 100 or the reception module 300 is in state of the pairing error, a guide for repairing may be displayed (S23).

In the case of the pairing error, the display 311 may display the guide for repairing. The guide for repairing may be stored in the memory 313 in the form of an image.

FIG. 23 is a view illustrating an example of the guide displayed for repairing through the reception module according to an embodiment of the present disclosure.

The repairing may require resetting at least one of the transmission module 100 or the reception module 300. Therefore, as illustrated in (a) of FIG. 23, the guide for repairing may include a first message requesting pressing of a button provided in the transmission module 100 for a set time and a second message requesting pressing of a button provided in the reception module 100 for a set time. According to an embodiment, the first message and the second message may be displayed simultaneously as illustrated in (a) of FIG. 23 or displayed separately and sequentially unlike in (a) of FIG. 23.

In addition, the guide for repairing may further include a QR code, and the QR code may guide an installation method/customer center and the like.

While the display 311 displays the guide for repairing, the first LED module 184 of the transmission module 100 may output flickering green light, and the LED module 305 of the reception module 300 may output flickering red light.

The display 311 may display the guide for repairing, and when the repairing is in progress, the display 311 may display a repairing progress guide as illustrated in (b) of FIG. 23.

If the repairing fails, the display 311 may display the guide for repairing again.

When the repairing is completed, the reception module 300 may check whether the first wireless communication is connected (S25). Since this is the same as that described in operation S13, redundant description will be omitted.

All of the guides for the first wireless communication connection, the guide for the second wireless communication connection, and the guide for repairing described above may be stored in the reception module 300, and thus, the guides may be output normally.

In addition, each of the guide for the first wireless communication connection, the guide for the second wireless communication connection, and the guide for repairing may be continuously displayed until the problem is solved, and the display 311 may move the display position of the guide to display the afterimage to minimize the problem.

Figure 24:
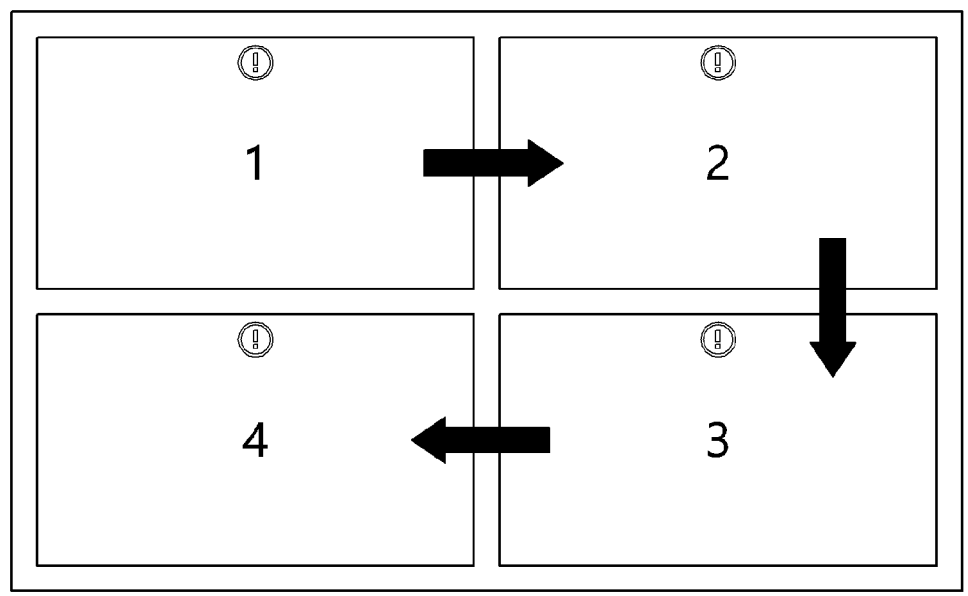
FIG. 24 is a view illustrating an example of a method for displaying a guide through the reception module according to an embodiment of the present disclosure.

FIG. 24 is a view illustrating an example of a method for displaying the guide through the reception module according to an embodiment of the present disclosure.

When displaying the guide stored in the memory 313, the display 311 may adjust the guide to ¼ or less of the entire screen, and as illustrated in FIG. 24, the guides may be sequentially displayed at the first position, the second position, the third position, and the fourth position.

When the display 311 displays the guide, a position of the guide may be changed every predetermined period.

Thus, there are advantages of minimizing the case in which the guides are continuously displayed at specific positions, and also, minimizing the occurrence of afterimages.

The transmission module 100 and the reception module 300 may display an image when the first wireless communication and the second wireless communication are connected (S27).

That is, the transmission module 100 may transmit an image signal to the reception module 300, and the reception module 300 may display an image on the display 311 according to the image signal received from the transmission module 100.

At least one of the transmission module 100 or the reception module 300 may detect an operation error while displaying the image (S29).

The operation error may include video interruption due to a decrease in signal strength of the first wireless communication, failure of a temperature sensor, overheating, and disconnection of the second wireless communication, but these are merely examples.

When a problem occurs that at least the first wireless communication is disconnected, the display 311 may display the guide stored in the memory 313. However, if the first wireless communication is connected, the reception module 300 may receive the guide from the transmission module 100 to display the guide on the display 311.

Specifically, when the operation error occurs, the display 311 may receive the guide from the transmission module 100 to display the received guide. For example, when the first wireless communication is connected, and only the second wireless communication is disconnected, the transmission and reception of the AV signal is possible, and thus, the transmission module 100 may transmit the guide stored in the transmission module 100 to the reception module 100, and the reception module 300 may display the guide received from the transmitting module 100 on the display 311.

As described above, when the guide related to the disconnection of the first wireless communication is stored in the reception module 300, the guide may be displayed normally, and the guide stored in the reception module 300 may be minimized, that is, the memory 313 may be minimized, and thus, there is an advantage in that the size of the reception module 300 is minimized.

The transmission module 100 and the reception module 300 may display an image when an operation error is not detected.

When the operation error is detected, the transmission module 100 and the reception module 300 may receive and display a guide corresponding to the detected operation error from the transmission module 100 (S31).

Figure 25:
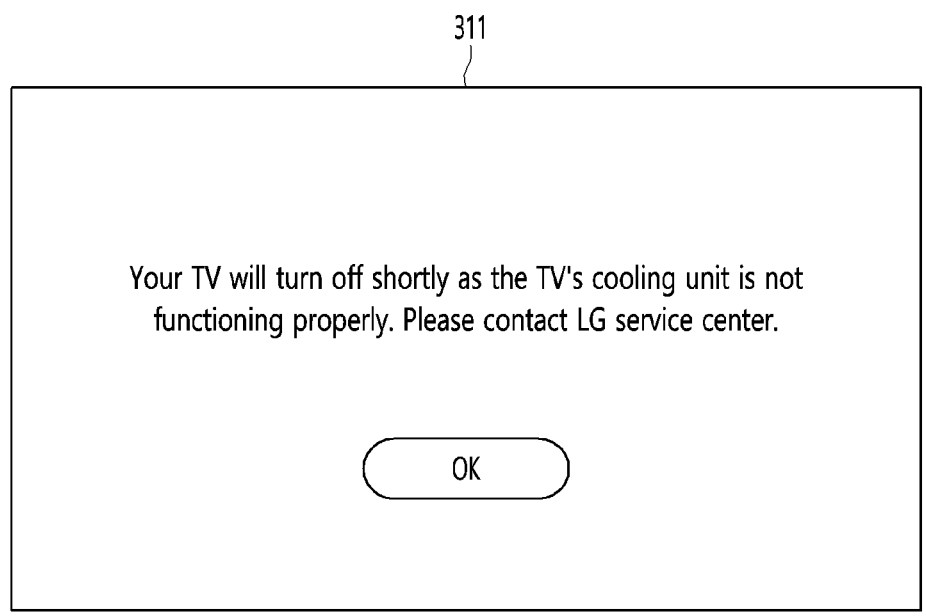
FIG. 25 is a view illustrating an example of a guide displayed by being received from the transmission module through the reception module according to an embodiment of the present disclosure.

FIG. 25 is a view illustrating an example of a guide displayed by being received from the transmission module through the reception module according to an embodiment of the present disclosure.

As in the example of FIG. 25, the display 311 may display a guide indicating that power is to be turned off due to the failure of the temperature sensor.

In addition, when the signal strength of the first wireless communication is weak, the display may receive and display the screen as illustrated in FIG. 16 from the transmission module 100 so that the display 311 guides the wireless communication situation and then set the wireless communication connection environment between the transmission module 100 and the reception module 300.

As described above, when the reception module 300 receives the guide from the transmission module 100, there is an advantage in that the guide is displayed in a text format without being limited to the image because language conversion is free.

To summarize the method for operating the wireless display system, the reception module 300 may display the guide stored in the memory 313 on the display 311 when the wireless communication with the transmission module 100 is not connected. That is, the wireless communication may include first wireless communication for receiving the image signal from the transmission module 100 and second wireless communication for receiving the control signal from the transmission module 100, and the display 311 may be configured to display at least one guide stored in the memory 313 when at least one of the first wireless communication or the second wireless communication is not connected.

Particularly, even when the second wireless communication is not connected, the guide stored in the reception module 300 may be displayed. As the reception module 300 does not transmit the control signal to the transmission module 100, the transmission module 100 may not transmit any signal to the reception module 300. Specifically, when the remote control device 200 transmits the control signal as IR, since the reception module 300 receives the control signal from the remote control device 200, and the reception module 300 transmits the control signal to the transmission module 100 in a Bluetooth transmission method, if the transmission module 100 does not receive the control signal from the reception module 300, the remote control device 200 may also recognized as being disabled so as not to transmit the guide to the reception module 300. Therefore, even in this case, the reception module 300 may display the guide stored in the memory 313 by itself.

When the first wireless communication is not connected, the display 311 may be configured to display different guides when the second wireless communication is not connected and when a pairing error occurs (300) between the transmission module 100 and the reception module 300. Specifically, the display 311 may be configured to: display a guide for adjusting an installation environment of the transmission module 100 or the reception module 300 when the first wireless communication is not connected; and display a guide for turning off the second wireless communication of a peripheral device or a guide for repairing when the wireless communication is not connected. The display 311 may be configured to display the guide for requesting the power check of the transmission module 100 before displaying the guide for turning off the second wireless communication of the peripheral device.

The reception module 300 may display the guide while the wireless communication with the transmission module 100 is not connected, and display the image received from the transmission module 100 when the wireless communication with the transmission module 100 is connected.

When the signal strength of the wireless communication is weak (distinguished from the disconnection of the wireless communication), the reception module 300 may receive the guide for setting the wireless communication connection environment from the transmission module 100 to display the guide.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

The invention claimed is:

1. A wireless display system comprising:
   a reception module comprising a display and a memory; and
   a transmission module configured to receive an image signal and a control signal and transmit the received image signal and the control signal to the reception module,
   wherein the reception module is configured to display a guide stored in the memory on the display when wireless communication with the transmission module is not connected,
   wherein the wireless communication comprises first wireless communication for receiving the image signal from the transmission module and second wireless communication for receiving the control signal from the transmission module, and
   wherein the display is configured to display a guide for adjusting an installation environment of the transmission module or the reception module when the first wireless communication is not connected.

2. The wireless display system according to claim 1, wherein, when signal strength of the wireless communication is weak, the reception module is configured to receive a guide for setting a wireless communication connection environment from the transmission module so as to display the guide.

3. The wireless display system according to claim 1, wherein
   the display is configured to display at least one guide stored in the memory when at least one of the first wireless communication or the second wireless communication is not connected.

4. The wireless display system according to claim 3, wherein, when the first wireless communication is not connected, the display is configured to display different guides when the second wireless communication is not connected and when a pairing error occurs between the transmission module and the reception module.

5. The wireless display system according to claim 4, wherein the display is configured to:
   display a guide for turning off the second wireless communication of a peripheral device or a guide for repairing when the second wireless communication is not connected.

6. The wireless display system according to claim 4, wherein the display is configured to display a guide for requesting power check of the transmission module before displaying a guide for turning off the second wireless communication of a peripheral device.

7. The wireless display system according to claim 3, wherein the first wireless communication is WiGig, and the second wireless communication is Bluetooth.

8. The wireless display system according to claim 3, wherein, when the display displays the guide, a position of the guide is changed every predetermined period.

9. The wireless display system according to claim 1, wherein the reception module is configured to:
   display the guide while the wireless communication with the transmission module is not connected; and
   display an image received from the transmission module when the wireless communication with the transmission module is connected.

10. The wireless display system according to claim 1, wherein the transmission module comprises:

a first LED module configured to display power or an error status; and a second LED module configured to display a status of the wireless communication.

11. A reception module comprising:

an AV reception unit configured to receive an image signal from a transmission module;

a wireless communication unit configured to receive a control signal from the transmission module;

a display configured to display an image based on the image signal; and a memory, wherein the display is configured to display a guide stored in the memory when wireless communication with the transmission module is not connected, wherein the wireless communication comprises first wireless communication for receiving the image signal from the transmission module and second wireless communication for receiving the control signal from the transmission module, and wherein the display is configured to display a guide for adjusting an installation environment of the transmission module or the reception module when the first wireless communication is not connected.

12. The reception module according to claim 11, wherein, when signal strength of the wireless communication is weak, the display is configured to receive the guide for setting a wireless communication connection environment so as to display the guide.

13. The reception module according to claim 11, wherein the display is configured to display at least one guide stored in the memory when at least one of the first wireless communication or the second wireless communication is not connected.

14. The reception module according to claim 13, wherein, when the first wireless communication is not connected, the display is configured to display different guides when the second wireless communication is not connected and when a pairing error occurs between the transmission module and the reception module.

15. The reception module according to claim 14, wherein the display is configured to:

display a guide for turning off the second wireless communication of a peripheral device or a guide for repairing when the second wireless communication is not connected.

* * * * *